US006856742B2

(12) United States Patent
Broeng et al.

(10) Patent No.: US 6,856,742 B2
(45) Date of Patent: Feb. 15, 2005

(54) OPTICAL FIBRES WITH SPECIAL BENDING AND DISPERSION PROPERTIES

(75) Inventors: Jes Broeng, Birkerød (DK); Stig Eigil Barkou Libori, Soborg (DK); Anders Overgaard Bjarklev, Rosklide (DK)

(73) Assignee: Crystal Fibre A/S, Birkerod (DK)

( * ) Notice: Subject to any disclaimer, the term of this patent is extended or adjusted under 35 U.S.C. 154(b) by 0 days.

(21) Appl. No.: 10/416,023

(22) PCT Filed: Nov. 12, 2001

(86) PCT No.: PCT/DK01/00746

§ 371 (c)(1),
(2), (4) Date: Oct. 15, 2003

(87) PCT Pub. No.: WO02/39159

PCT Pub. Date: May 16, 2002

(65) Prior Publication Data

US 2004/0052484 A1 Mar. 18, 2004

(30) Foreign Application Priority Data

Nov. 10, 2000 (DK) .................................. 2000 01686

(51) Int. Cl.[7] .............................................. G02B 6/20
(52) U.S. Cl. ...................................... 385/125; 385/126
(58) Field of Search ................................ 385/123–128

(56) References Cited

U.S. PATENT DOCUMENTS

| 5,802,236 | A | 9/1998 | DiGiovanni et al. ......... 385/127 |
| 2002/0061176 | A1 | 5/2002 | Libori et al. ................. 385/125 |
| 2003/0077058 | A1 * | 4/2003 | Russell et al. .............. 385/125 |

FOREIGN PATENT DOCUMENTS

| WO | 99/00685 | 1/1999 |
| WO | 99/64903 | 12/1999 |
| WO | 99/64904 | 12/1999 |
| WO | 00/60390 | 10/2000 |

OTHER PUBLICATIONS

Birks, T.A. et al., "Endlessly single–mode photonic crystal fiber," Optics Letters, 22(13): 961–963 (1997).
Broeng, Jes et al., "Photonic Crystal Fibers: A New Class of Optical Waveguides," Optical Fiber Technology, 5: 305–330 (1999).

(List continued on next page.)

Primary Examiner—Juliana K. Kang
(74) Attorney, Agent, or Firm—Jacobson Holman PLLC

(57) ABSTRACT

A microstructured optical fiber having a specially designed cladding to provide single mode waveguidance and low sensitivity to bending losses. In one aspect the optical fiber has an inner and an outer cladding each comprising elongated features. The inner cladding features have normalized dimensions in the range from 0.35 to 0.50 and the outer cladding features have normalized dimensions in the range from 0.5 to 0.9, where the normalization factor is a typical feature spacing. The fiber is further characterized by a feature spacing of the inner cladding larger than 2.0 micron. In a second aspect, the fiber has a special non-circular and non-equilateral-polygonial outer cross-sectional shape to mechanically ensure bending in predetermined directions that are favourable with respect to low bending losses. The present invention provides fibers, which are less sensitive to macro-bending losses than presently known single-mode fibers with similar sized mode areas, and provides robust, single-mode, large-mode area fibers for long-distance optical transmission and fibers with special dispersion properties.

45 Claims, 23 Drawing Sheets

OTHER PUBLICATIONS

Broeng, Jes et al., "Waveguidance by the photonic bandgap effect in optical fibres," Pure and Applied Optics, 1: 477–482 (1999).

Knight, J.C. et al., "Large mode area photonic crystal fibre," Electronics Letters, 34(13): 1347–1348 (1998).

Knight, J.C. et al., "Photonic crystals as optical fibres—physics and applications," Optical Materials, 11: 143–151 (1999).

Knight, J.C. et al., "Properties of photonic crystal fiber and the effective index model," J. Opt. Soc. Am. A, 15(3): 748–752 (1998).

Monro, Tanya M., et al., "Holey fibers with random cladding distributions," Optics Letters, 25(4): 206–208 (2000).

Sorensen, T. et al., "Macro–bending loss properties of photonic crystal fibre," Electronics Letters, 37(5), (2001).

Sorensen, Thorkild, et al., "Macrobending loss properties of photonic crystal fibres with different air filling fractions," $27^{th}$ European Conference on Optical Communication, paper We.P.1, Amsterdam, 2001.

* cited by examiner

OPTICAL FIBRES WITH SPECIAL BENDING AND DISPERSION PROPERTIES

This is a nationalization of PCT/DK01/00746 filed Nov. 12, 2001 and published in English.

FIELD OF THE INVENTION

The present invention relates to electromagnetic waveguides, especially optical fibres, having micro-structures in core and/or cladding region(s).

BACKGROUND OF THE INVENTION

While transmission speeds are pushed into the Tbit range for modern, multi-channel telecommunication systems, a large interest is pointed towards new optical fibres with relatively large mode areas. One of the key issues is to avoid disturbance of individual channels, while these are transmitted over a fibre link. The disturbance is mainly related to non-linear effects in the fibres—effects that can be suppressed or in practice eliminated by the use of fibres with large mode areas and/or special dispersion properties.

For many applications, a large mode area can, however, not be tolerated using presently known fibres, since such fibres exhibit high macro-bending losses. This is e.g. the case for applications where fibres are used in compact modules and consequently must be coiled with relatively small bending radil—typically around 6 cm—such as for dispersion compensating fibre modules. The present invention solves the problem of macro-bending sensitive large-mode area fibres, and provides robust, single-mode, large-mode area fibres for long-distance optical transmission and for fibres with special dispersion properties such as dispersion-shifted fibres, dispersion compensating and dispersion slope compensating fibres. Typically, optical fibres for dispersion compensation have a core diameter of around 4 μm, and the present invention provides fibres with core diameter larger than 4 μm.

Recently a new type of optical fibre that is characterized by a so-called micro-structure has been demonstrated. Optical fibres of this type (which are referred to by several names—e.g. micro-structured fibres, photonic crystal fibres, holey fibres, or photonic bandgap fibres) have been described in a number of references, such as WO 99/64903, WO 99/64904, and Broeng et al. (see Pure and Applied Optics, pp.477–482, 1999) describing such fibres having claddings defining Photonic Band Gap (PBG) structures, and U.S. Pat. No. 5,802,236, Knight et al. (see J. Opt. Soc. Am. A, Vol. 15, No. 3, pp. 748–752, 1998), Monro et al. (see Optics Letters, Vol.25 (4), p.206–8, February 2000) defining fibres where the light is transmitted using modified Total Internal Reflection (TIR). This invention concerns mainly fibres that are guiding by TIR.

Micro-structured fibres are known to exhibit waveguiding properties that are unattainable using conventional fibres. One of these unique properties is that micro-structured fibres can be designed to be so-called endlessly single mode (see Birks et al. Optics Letters, July 1, 22(13), pp. 961–963, 1997). Such fibres have a very important aspect, namely that they, in principle, can be designed with a very large mode area at any desired wavelength while remaining single mode (see Birks et al. Electronics Letters, June 25, 34(13), pp. 1347–1348, 1998, and WO 99/00685). Although endlessly single mode fibres known from the prior art may, in theory, have infinitely large mode areas, the fibres will in practice have a mode area that is limited by macro-bending losses (see Sørensen et al. Electronics Letters, Vol.37, no.5, 1$^{st}$ Mar. 2001 and Sørensen et al. 27$^{th}$ European Conference on Optical Communication, paper We.P.1, Amsterdam, 2001). As demonstrated in the literature, the prior art, endlessly single mode fibres must have a filling fraction of the micro-structured cladding that is lower than a certain critical value. Often the micro-structured cladding is formed using periodically arranged air holes in a silica background material, as for the fibres in the above-cited references. The critical air filling fraction of prior art endlessly, single mode micro-structured fibre designs has been investigated both experimentally by Knight et al. (see the above-cited Knight reference) and theoretically by Broeng et al. (see Broeng et al, Optical Fiber Technology, Vol. 5, pp.305–330 1999). In theory, for fibres made from pure silica, having circular air holes placed in a close-packed arrangement—or triangular arrangement—a critical filling fraction of 18% has been found. In practice, for prior art fibres a lower filling fraction—of less than 5%—has been found. Hence, fibres known from the prior art are not able to be endlessly single-mode (and, therefore, to have a very large mode area) unless the filling fraction is below at least 18%. For close-packed arrangement of air holes in silica, the critical air filling fraction of 18% corresponds to a hole diameter, d, of around 0.45 times the center-to-centre spacing, Λ, of to nearest air holes.

The present inventors have realized that a more appropriate parameter with respect to the cut-off properties of micro-structured fibres, is the minimum spacing, w, between boundaries of two nearest holes. By geometrical considerations, w may be deduced to be equal to Λ−d. Hence, the above-mentioned critical air filing fraction of 18%—or critical hole diameter of 0.45Λ—corresponds to a critical (minimum) w value of 0.55Λ.

The critical filling fraction is an important parameter for practical applications, as it is one of the key parameters that determine the robustness of a micro-structured fibre in terms of low macro-bending losses. A large filling fraction is a general requirement in order to eliminate macro-bending losses.

It is a disadvantage of single-mode, micro-structured fibres with core diameters above 4 μm, which are known in the prior art, that they have filling fractions of 18% or smaller. The present invention discloses a number of new designs of relatively large mode area, single mode fibres with larger critical air filling fraction than known from the prior art, as well as a method for producing fibres with such designs. This is achieved be using two concentric cladding regions—an inner and an outer cladding region—where the outer cladding region has a filling fraction larger than 18% and the inner cladding region is designed to have w around $0.55\Lambda_i$, where $\Lambda_i$ is the center-to-centre spacing of two nearest features in the inner cladding. Hence, in the case of both the inner and outer cladding features being circular air holes, the inner cladding features have a diameter, $d_i$, of around $0.45\Lambda_i$, whereas the outer cladding features have a diameter, $d_o$, larger than $0.50\Lambda_o$ ($\Lambda_o$ being the center-to-centre spacing of two nearest features in the outer cladding). The larger filling fraction in the outer cladding provides improved macro-bending losses properties, whereas the design of the inner cladding features ensures single mode operation. Hence, the present invention provides greater flexibility when designing fibres having relatively large mode areas (larger than 4 μm in core diameter) with respect to macro-bending losses and/or dispersion properties. Fibres according to the present invention will be less sensitive to macro-bending losses than presently known single-mode fibres with similar sized mode areas—due to the special relation between the dimensions of the inner and outer cladding features. Furthermore, single-mode fibres according to the present invention may be utilized for applications, where a relatively large mode area and specifically tailored dispersion properties are of importance, such as dispersion compensating fibres and dispersion slope compensating fibres. The fibres are, however, not only of interest in optical telecommunication, but also for very high power light transmitting systems, such as e.g. laser machining and medical surgery, as well as the fibres are of interest for sensing systems.

GLOSSARY AND DEFINITIONS

In this application we distinguish between "refractive index" and "effective refractive index". The refractive index is the conventional refractive index of a homogeneous material. In this application, we consider mainly optical wavelengths in the visible to near-infrared regime (wavelengths from approximately 300 nm to 2 $\mu$m). In this wavelength range most relevant materials for fibre production (e.g. silica) may be considered mainly wavelength independent, or at least not strongly wavelength dependent. However, for non-homogeneous materials, such as micro-structures, the effective refractive index is very dependent on the morphology of the material. Furthermore, the effective refractive index of a micro-structure is strongly wavelength dependent—much stronger than the refractive index of any of the materials composing the micro-structure. The procedure of determining the effective refractive index of a given micro-structure at a given wavelength is well-known to those skilled in the art (see e.g. Jouannopoulos et al, "Photonic Crystals", Princeton University Press, 1995 or Broeng et al, Optical Fiber Technology, Vol. 5, pp.305–330, 1999). The present invention takes advantage of specific micro-structure morphologies, their strong wavelength dependency, and proper core design in a way to realize large filling fraction, single mode fibres. A further useful parameter is the geometrical index, which may very simply be determined from direct inspection of the cross-sectional morphology of a micro-structured fibre and knowledge of the refractive indices of the materials that compose the micro-structure. Hence, a silica-air micro-structured region with an air filling fraction of 18% (for example a region with air holes having a diameter of 0.45Λ) will have a geometrical index of 0.18*1.0+0.82*1.45 equal to 1.369 (where the refractive indices of air and silica have been assumed equal to 1.0 and 1.45, respectively).

Usually a numerical method capable of solving Maxwell's equation on full vectorial form is required for accurate determination of the effective refractive indices of micro-structures. The present inventors make use of such a method that has been well-documented in the literature (see previous Joannopoulos-reference). In the long-wavelength regime, the effective refractive index is roughly identical to the weighted average of the refractive indices of the constituents of the material. For micro-structures, a directly measurable quantity is the so-called filling fraction, f, that is the volume of disposed features in a micro-structure relative to the total volume of that micro-structure. Of course, for fibres that are invariant in the axial fibre direction, the filling fraction may be determined from direct inspection of the fibre cross-section.

SUMMARY OF THE INVENTION

The main problem solved by the present invention is to guide light in single-mode micro-structured fibres, while having a large-mode area and negligible macro-bending losses. The fibres are aimed at applications at visible to near-infrared wavelengths. Large features (usually in the form of air holes) in the cladding of micro-structured fibres provide generally lower macro-bending losses and it is, therefore, desirable to realize micro-structured fibres with large features. The main problem for the fibre designs disclosed in the prior art is, however, that above a certain air hole size, the fibres may become multi-mode. To those skilled in the art it is well known that prior art micro-structured fibres with close-packed air holes in a silica cladding and a single missing air hole to form the core require small cladding features (a filling fraction below 18%) in order to obtain single-mode operation for large core sizes.

It is a disadvantage of single-mode, micro-structured fibres with core diameters above 4 $\mu$m, which are known in the prior art, that they have filling fractions of 18% or smaller. The present invention discloses a number of new designs of relatively large mode area, single mode fibres with larger critical air filling fraction than known from the prior art, as well as a method for producing fibres with such designs. This may be achieved be using two concentric cladding regions—an inner and an outer cladding region—where the outer cladding region has a filling fraction larger than 18% and the inner cladding region is designed to have w around 0.55$\Lambda_i$, where $\Lambda_i$ is the center-to-centre spacing of two nearest features in the inner cladding. Hence, in the case of both the inner and outer cladding features being circular air holes, the inner cladding features may have a diameter, $d_i$, of around 0.45$\Lambda_i$, whereas the outer cladding features may have a diameter, $d_o$, larger than 0.50$\Lambda_o$ ($\Lambda_o$ being the center-to-centre spacing of two nearest features in the outer cladding). The larger filling fraction in the outer cladding may provide improved macro-bending loss properties, whereas the design of the inner cladding features ensures single mode operation. Hence, the present invention may provide greater flexibility when designing fibres having relatively large mode areas (larger than 4 $\mu$m in core diameter) with respect to macro-bending losses and/or dispersion properties. Fibres according to the present invention will be less sensitive to macro-bending losses than presently known single-mode fibres with similar sized mode areas— due to the special relation between the dimensions of the inner and outer cladding features. Furthermore, single-mode fibres according to the present invention may be utilized for applications, where a relatively large mode area and specifically tailored dispersion properties are of importance, such as dispersion compensating fibres and dispersion slope compensating fibres. The fibres are, however, not only of interest in optical telecommunication, but also for very high power light transmitting systems, such as e.g. laser machining and medical surgery, as well as the fibres are of interest for sensing systems.

According to a first aspect of the invention, there is provide a micro-structured optical fibre for guiding light at an operating wavelength, said optical fibre having an axial direction and a cross section perpendicular to said axial direction, said optical fibre comprising:

a core region;

an inner cladding region surrounding said core region, said cladding region comprising a multiplicity of spaced apart inner cladding features that are elongated in the fibre axial direction and disposed in an inner cladding material, said inner cladding features having a smallest cross-sectional dimension, $d_{i,min}$, and a largest cross-sectional dimension, $d_{i,max}$, and having a centreto-centre spacing, $\Lambda_i$, between two neighbouring inner cladding features;

an outer cladding region surrounding said inner cladding region, said outer cladding region comprising a multiplicity of spaced apart outer cladding features that are elongated in the fibre axial direction and disposed in an outer cladding material, at least part of said outer cladding features having a smallest cross-sectional dimension, $d_{o,min}$, and having a centre-to-centre spacing, $\Lambda_o$, between two neighbouring inner cladding features; wherein $d_{i,min}$ is in the range from $0.35\Lambda_i$ to $0.60\Lambda_i$, $d_{o,min}$ is in the range from $0.50\Lambda_o$ to $0.90\Lambda_o$, and $\Lambda_i$ is larger than 2 µm.

When in the present context reference is made to the "axial direction" and the "cross section" or the "cross-sectional dimension" in relation to the optical fibre and features therein (the features being located in the cladding or in the core), the cross section is to be taken to mean the cross section that is perpendicular to an axial line of the fibre when the fibre is straight. It is preferred that the cross section is substantially identical throughout the length of the optical fibre.

According to a first preferred embodiment of the invention, $d_{i,min}$ is smaller than $d_{o,min}$. Here it is also preferred that $d_{i,min}$ should be in the range from $0.35\Lambda_i$ to $0.50\Lambda_i$.

According to a second embodiment of the invention, $\Lambda_i$ is larger than $\Lambda_o$.

In a preferred embodiment, $d_{i,min}$ may be in the range from $0.40\Lambda_i$ to $0.45\Lambda_i$ or about $0.45\Lambda_i$. It is also preferred that $d_{o,min}$ may be in the range from $0.50\Lambda_o$ to $0.60\Lambda_o$.

The inner cladding features may have different shapes, including substantially circular and elliptical, but it is preferred that $d_{i,max}$ is in the range from $1.0d_{i,min}$ to $2.0d_{i,min}$. It is also within a preferred embodiment that $d_{i,max}$ is larger than 0.45 times the core radius. In another preferred embodiment $d_{i,max}$ is larger than $0.45\Lambda_i$, such as larger than $2\Lambda_i$.

For the centre-to-centre spacing of the cladding features, it is preferred that $\Lambda_i$ is in the range from $0.3\Lambda_o$ to $3.0\Lambda_o$, or $\Lambda_i$ is about equal to $\Lambda_o$.

Here it should be understood that according to the invention, the inner cladding features may have substantially equal cross-sectional dimensions, or they may have different cross-sectional dimensions. However, the smallest cross-sectional dimension should be within the interval for $d_{i,min}$, the largest cross-sectional dimension should be within the interval for $d_{i,max}$, and the centre-to-centre spacing for the inner cladding features should be larger than 2.0 µm. It should also be understood that for the part of the outer cladding features having a smallest cross-sectional dimension given by the interval for $d_{o,min}$, these outer cladding features may have substantially equal cross-sectional dimensions, or they may have different cross-sectional dimensions, as long as the smallest cross-sectional dimension is within the interval for $d_{o,min}$.

The first aspect of the invention also includes embodiments in which $\Lambda_i$ is larger than 2.5 µm, such as larger than 3 µm, such as larger than 5 µm, such as larger than 10 µm, or such as larger than 25 µm.

According to the first aspect of the invention it is preferred that the at least part of the outer cladding features have a larger cross-sectional dimension than the inner cladding features. Thus, it is preferred that $d_{o,min}$ is between 10–50% larger than $d_{i,min}$, such as $d_{o,min}$ being between 10–20% larger than $d_{i,min}$, or such as $d_{o,min}$ being between 10–15% larger than $d_{i,min}$.

It is preferred that the optical fibre of the first aspect of the invention is dimensioned for guiding light through total internal reflection or modified total internal reflection. Thus, when looking at the geometrical indices it is preferred that the core region has a geometrical index $N_{coge}$, the inner cladding region has a geometrical index $N_{ige}$, the outer cladding region has a geometrical index $N_{oge}$, and $N_{coge} > N_{ige} >$ or $= N_{oge}$ for light guided at the operating wavelength. Similarly, when looking at the effective refractive indices, it is preferred that the core region has an effective refractive index $N_{coef}$, the inner cladding region has an effective refractive index $N_{ief}$, the outer cladding region has an effective refractive index $N_{oef}$, and $N_{coef} > N_{ief} >$ or $= N_{oef}$ for light guided at the operating wavelength.

It should be understood that the outer cladding region may comprise cladding features of different cross-sectional shapes and/or areas. However, it is preferred that the outer cladding features being nearest neighbours to the inner cladding region all have a smallest cross-sectional dimension given by $d_{o,min}$. It is also within a preferred embodiment that a majority or all of the outer cladding features have a smallest cross-sectional dimension given by $d_{o,min}$. It is preferred that part of or all of the outer cladding features have a substantially circular cross-sectional shape.

The present inventors have realized that the critical filling fraction may be increased by distributing cladding features (typically air holes) around the core with a non-circular shape, where the features have a largest dimension that is substantially directed towards the core centre (the cladding features are elongated, each having substantially an axis of symmetry that is directed towards the core centre). In this manner the bridging width, w, may be kept approximately equal to $0.5\Lambda_i$ while the air filling fraction is increased above the level of a close-packed structure with similar value of w. This may ensure single mode operation for fibres according to the present invention while a larger filling fraction is obtained. Thus, the inner cladding features may have a non-circular shape with $d_{i,max}$ being larger than $d_{i,min}$, and it is within an embodiment of the invention that at least part of or all of the inner cladding features in the cross-section have an elongated shape, with the largest cross-sectional dimension $d_{i,max}$ being oriented in a direction substantially towards the centre of the core region. Here it is preferred that the largest dimension is at least 10% larger than the smallest dimension. The largest dimension may also be at least 50% larger than the smallest dimension.

According to a preferred embodiment, the individual elongated features may have a substantially two-fold symmetry, and the largest and smallest dimensions each define an axis with these two axes being substantially orthogonal.

When having elongated innermost cladding features, it may be more appropriate to describe the core using an inner dimension—defined as the smallest dimension through the core centre that does not touch the innermost cladding features. In preferred embodiments, the inner cladding dimension is at least 2.0 µm, and preferably up to at least 25.0 µm. In other preferred embodiments, the inner core dimension may be smaller than the inner cladding feature centre-to-centre spacing $\Lambda_i$. This may improve the cut-off properties of the fibres.

The first aspect of the invention may cover embodiments, in which the cladding features are periodical features, but it may also cover embodiments in which all or at least a part of the cladding features are non-periodical features. Thus, the present invention includes micro-structured fibres, where the cladding features, which may be elongated features, may be either non-periodically or periodically distributed. Hence, when we are discussing the spacing of the cladding features, we will mean the representative centre-to-centre distance between two neighbouring features. For periodically distributed features, this centre-to-centre spacing is easily determined, and is e.g., for a close-packed arrangement of features identical to the pitch of the periodic structure. For non-periodic distributions, the centre-to-centre spacing should be taken as the average centre-to-centre distance between neighbouring features in the relevant region. For special distributions, e.g., in the case of a very low number of features, the centre-to-centre spacing should be taken as a representative centre-to-centre distance between neighbouring features in the relevant region.

The present inventors have further realised that micro-structured fibres may be improved by providing a non-circular outer cladding to mechanically ensure bending in certain preferred directions. The orientation of the outer cladding should preferably depend on the specific micro-structuring of the central part of the fibre (the core and inner cladding region). Thus, according to a second aspect of the present invention, there is provided a micro-structured optical fibre for guiding light at an operating wavelength, said optical fibre having an axial direction and a cross section perpendicular td said axial direction, said optical fibre comprising:

a core, and
a cladding region surrounding said core region, said cladding region comprising a multiplicity of spaced apart cladding features that are elongated in the fibre axial direction and disposed in a cladding material,
wherein the cross-sectional outer shape of the optical fibre has a non-circular and non-equilateral-polygon form.

Such an outer shape may be of advantage for controlling polarization, macro-bending, and/or dispersion properties.

Here, the cladding region may comprise an outer cladding region surrounding an inner cladding region, with the inner cladding region surrounding the core region. It is preferred that the outer shape of the optical fibre is formed by the cladding region surrounding the core region or by the outer cladding region surrounding the inner cladding region. It is also preferred that at least part of or all of the multiplicity of spaced apart cladding features are arranged in the inner cladding region.

According to an embodiment of the second aspect of the invention, the outer shape may be characterized by a largest cross-sectional outer dimension and a smallest cross-sectional outer dimension, and said largest outer dimension may be at least 10% larger than said smallest outer dimension. Here, the largest outer dimension may be larger than 80 mm, such as larger than 125 mm.

According to the second aspect of the invention, the cross-sectional outer shape may have different shapes, but it is preferred that the cross-sectional outer shape of the fibre has a substantially elliptical form. However, it is also within the invention that the cross-sectional outer shape of the fibre has a substantially rectangular form.

In a preferred embodiment of the second aspect of the invention, the smallest outer dimension defines a first axis, where said first axis substantially coincides with an axis through centres of two innermost, cladding features positioned on opposite sides of a core centre, or where said first axis is substantially parallel to a second axis through centres of two innermost, cladding features positioned on opposite sides of a core centre. The present inventors have realized that such an orientation of a non-circular outer cladding region with respect to the orientation of the micro-structure around the core region may reduce macro-bending losses of micro-structured fibres.

In another preferred embodiment of the second aspect of the invention, the smallest outer dimension defines a first axis, and said first axis is substantially orthogonal to a third axis through centres of two innermost, cladding features positioned on opposite sides of a core centre. The present inventors have realized that such an orientation may strip off higher order modes efficiently and expands the single mode range of micro-structured fibres.

The second aspect of the invention covers embodiments in which the cladding region or the inner cladding region comprises a first and a second sub-region with one or both of said sub-regions comprising a number of cladding features, and wherein the core features of the first sub-region in the cross section occupies a part of the first sub-region thereby defining a first filling fraction, and the core features of second sub-region in the cross section occupies a part of the second sub-region thereby defining a second filling fraction, said first filling fraction being different to the second filling fraction. This may provide fibres with special bending properties, where electromagnetic energy (light) radiated away from the fibre core during bending is directed in predetermined direction(s).

Here, one of the two sub-regions may have a filling fraction of more than 18%, and the other sub-region has a filling fraction of less than 18%. This may provide fibres that are single mode and macro-bending insensitive even for large mode areas, and small bending radil. Such fibres displays special dispersion properties, that may actively be tuned through tuning of the bending radius.

The second aspect of the invention also provides embodiments in which the cladding region or the inner cladding region comprises four sub-regions, with at least one or all of said sub-regions comprising a number of cladding features, whereby for each sub-region a filling fraction is defined by the part of the sub-region being occupied in the cross section by cladding features. This may further improve the possibility of realizing single-mode, large-mode areas fibres that are insensitive to macro-bending. Here, two of the four subregions may have a filling fraction of more than 18%, and the other two sub-regions have a filling fraction of less than 18%.

For embodiments with cladding sub-regions, it is preferred that a cladding sub-region having a lower filling fraction comprises a number of cladding features having a smaller cross-sectional area than the cross-sectional area of the cladding features of a sub-region with a higher filling fraction. Here, when the smallest outer dimension defines a first axis, the first axis may substantially divide the cladding sub-region(s) having a lower filling fraction into two substantially equally sized halves. The present inventors have realized that such an orientation of the non-circular, outer cladding region with respect to the micro-structure in the fibre, is optimum for certain fibres, such as fibres with direction-dependent radiation during fibre bending. In a further preferred embodiment, the first axis is substantially dividing the cladding sub-region(s) having a larger filling fraction in halves. The present inventors have realized that such an orientation of the non-circular, outer cladding region with respect to the micro-structure in the fibre, provides lowest possible macro-bending losses for micro-structured fibres.

For certain applications, it is an advantage that the core material (the background material of the core region) has a different refractive index than the cladding material. This allows flexibility of tailoring the dispersive properties of the fibres. This refractive index difference may be obtained e.g., by using different dopants in the two materials (e.g. silica doped to various degrees), different glasses, or it may be obtained simply by using different basis materials (e.g., different types of polymers).

For both the first and the second aspects of the invention, it is preferred that the core region has an effective refractive index being is higher than the effective refractive index of the cladding region. This may ensure effective index guidance, also known as (modified) total internal reflection, for the guided light. Preferably, the core region is a substantially solid core made of a core material. Here, the effective refractive index of the core $N_{coef}$ and/or the geometrical index of the core $N_{coge}$ may be substantially equal to the refractive index of the core material.

Different materials and configurations may be used in order to obtain a core region having an effective refractive index being is higher than the effective refractive index of the cladding region. Thus, the aspects of the present invention cover embodiment in which the refractive index of the core material is lower than the refractive index of the inner and/or outer cladding material. This may allow further manipulation of the cut-off properties of the fibres. Such fibres need not be endlessly single mode, but will suppress the second-order mode cut-off compared to a fibre with the same core and cladding background material, but an otherwise identical design.

However, in other preferred embodiments, the refractive index of the core material is substantially equal to the refractive index of the inner and/or outer cladding material. This may e.g., be preferred in cases, where absorption losses are a critical issue, and the fibre must be fabricated from the purest possible material. In this case it is preferred to use the same material, which may be a pure material, for the core material, the inner cladding material and/or the outer cladding material. Also with respect to fabrication method, it may be an advantage to use the same core and cladding material (and, therefore, the same refractive index of the core and cladding material). This is e.g., the case, where a difference in thermal expansion coefficient for the core and cladding materials cannot be tolerated. The presently used fabrication methods for micro-structured fibres are generally not in favour of the use of different core and cladding materials. Hence, fibres with the same core and cladding material are preferred.

According to preferred embodiments of the aspects of the invention, the core material may be made of silica or polymer. It is also preferred that the inner and/or outer cladding material is made of silica or polymer.

However, the aspects of the invention also cover embodiments in which the core and/or any of the cladding materials comprise a dopant (e.g. an active or photosensitive material) or a material showing higher order (non-linear) optical effects such as an increased third-order non-linearity. Such preferred embodiments allows the realization of various applications, such as fibre laser, amplifiers, wavelength converters, optical switches etc. Higher order (non-linear) effects may be used for e.g., soliton communication or more generally in applications, where non-linear effects are influencing the propagation properties of signals in optical communication systems. This also includes realisation of components for optical signal processing and for switching. Especially for applications for fibre lasers or fibre amplifiers, the dopant in the core or the cladding may be e.g., a rare-earth dopant adapted to receive pump radiation and amplify radiation travelling in the core region. The dopant may also be a light sensitive dopant, such as Germanium. In that situation, the dopant may be used for e.g., optically writing a grating in the fibre or core region. Of particular interest is the use of photosensitive materials to allow writing of 1D gratings in the longitudinal direction of the fibres. Fibres with such gratings, combined with the large mode area, are very attractive for high power fibre lasers.

For the different aspects of the invention it is preferred that the cladding features are voids. Here, the voids of the cladding regions may contain air, another gas, or a vacuum.

Although it is preferred that the core region is substantially solid, the aspects of the invention also cover embodiments in which the core region comprises one core feature or a multitude of spaced apart core features. This may allow for an even higher flexibility for increasing the critical cladding filling fraction. Here, the core features may have a cross-sectional dimension being smaller than the smallest cross-sectional dimension of the inner and/or outer cladding features. According to embodiments of the invention, the core features may have a circular or non-circular symmetric shape in the fibre cross-section. It is preferred that the core features are voids, and the voids of the core region may contain air, another gas, or a vacuum. However, it is also within the aspects of the invention that at least part of or all of the core features and/or the cladding features are voids containing or filled up with a material having a refractive index that differs from the refractive index of the region containing the feature such as polymer(s), a material providing an increased third-order non-linearity, a photosensitive material, or a rare earth material (including in the form of dopants present in a host matrix as rare earth ions).

It should be understood that although it is preferred that the core region has a substantially circular cross-section, it is also within the aspects of the invention that the shape of the core region deviates substantially from a circular shape in the fibre cross-section. Thus, the shape of the core region may be substantially rectangular in the fibre cross-section. However, the shape of the core region may also or alternatively deviate substantially from a quadratic shape, a hexagonal shape, or a higher order polynomial shape in the fibre cross-section.

According to preferred embodiments of the aspect of the invention, the core region and/or the cladding regions may have substantially a 180 degree rotational symmetry in the fibre cross-section.

Fibres according to the aspects of the present invention are intended for use in a wide range of applications, where the light guided through the fibre will be in the range from about 0.3 $\mu$m to 2 $\mu$m and the light should be guided in a single mode. Thus, it is preferred that the optical fibre is dimensioned to guide light at an operating wavelength selected from wavelengths in the range of 0.3 $\mu$m to 2 $\mu$m, such as in the range of 0.3 $\mu$m to 1.6 $\mu$m in a single mode. Preferably, the optical fibre is dimensioned to guide light at an operating wavelength about 1.5 $\mu$m in a single mode.

For use in certain systems, the operating wavelength may be very short—typically in the interval from 0.3 $\mu$m to 0.6 $\mu$m. For other applications, the fibre may be desired for delivery of light from laser sources such as III–V semiconductor lasers—with a wavelength range from around 0.6 $\mu$m to 1.6 $\mu$m. Particularly, the wavelength range around 0.8 $\mu$m is of interest for delivery of light from relatively cheap GaAs based semiconductor lasers. For other applications, fibres according to the present invention may be used for applications such as delivery of light from powerful, tuneable Tl:Sapphire lasers. Hence, the fibres may be designed to guide light at wavelengths between 0.78 $\mu$m to 0.98 $\mu$m. For other systems, e.g., systems employing lasers and amplifiers based on rare-earth doping, the fibres may be desired to guide light at specific wavelengths, corresponding to transitions for particular rare-earths. Important transition lines are located around 1.06 μm and 1.55 μm. The fibres according to the present invention may be used for a number of telecommunication applications—e.g., for long-distance transmission, dispersion compensation or dispersion slope compensation—where the fibre will predominantly be used in the wavelength range from about 1.2 μm to 1.6 μm. Particularly, the fibres may find use in the so-called second and third telecommunication window, i.e., for wavelengths around 1.3 μm and for wavelengths from around 1.5 μm to 1.6 μm. For yet other applications, the fibres may find use at mid-infrared wavelengths, such as around 2.0 μm. The present invention covers preferred embodiments, where the operating wavelength is within the above-mentioned wavelength ranges.

For wavelength multiplexing applications used in telecommunication systems, it is preferred that the fibre is designed to be single mode at wavelengths in the range from 1.5 μm to 1.6 μm (or broader). For other applications, such as fibre amplifiers or fibre laser, the fibres are desired to be single-mode at a pump wavelength that may be significantly below this wavelength range. Therefore, preferred embodiments of the present invention covers fibres with single mode operation for wavelength ranges down to 0.3 μm.

According to preferred embodiments of the aspects of the invention, the core has a diameter larger than 10 μm. For future telecom applications a core size in the range from about 10 μm to 30 μm is desired. For high-power applications, a larger core size is desired such as from about 10 μm to 50 μm.

In order to obtain a strongly dispersive waveguide characteristic, the present inventors have realized how to utilize that the cladding region can be designed to have a higher effective refractive index than the core at wavelengths shorter than a normal operating wavelength, where the effective refractive index of the core is larger than the effective refractive index of the cladding. This provides a cut-off for the fundamental mode in the core region at a so-called shifting wavelength, where the effective refractive indices are equal, but a very strong dispersion at the (longer) normal operating wavelength. Therefore, the present invention covers fibres where the effective refractive index of the cladding is larger than the effective refractive index of the core below a shifting wavelength, this shifting wavelength being shorter than the normal operating wavelength. The present inventors have realized that the dispersion is strongest close to the shifting wavelength, and depending on the application of the fibres, the shifting wavelength may, therefore, be tailored to a specific value. In order to obtain the strong dispersion at particular predetermined wavelengths, the present invention, therefore, covers preferred embodiments, where the shifting wavelength is below 1.5 μm, where it is below 1.3 μm, below 1.06 μm, below 0.8 μm, below 0.6 μm, and below 0.4 μm.

For a range of applications, it is desirable to control the polarization of light guided through the fibre. The present fabrication techniques of micro-structured fibre do not allow the complete elimination of asymmetries in the fibre cross-section. As those skilled in the art will recognize, this means that the fundamental mode of micro-structured fibres will have two nearly degenerate polarization states. For micro-structured fibres, where polarization effects are sought eliminated (the fibres are intended to have a low birefringence), we will note the two polarization states as substantially non-degenerate. For micro-structured fibres where, on the other hand, polarization effects are desired, the non-degeneracy may be enhanced such that the birefringence can reach levels of $10^{-5}$ and even higher, such as of at least $10^{-3}$. We will note such fibres as having a fundamental mode consisting of two substantially, non-degenerate polarization states. For a long range of applications, such as e.g. for high precision lithographic systems, it is desired to have fibres with high birefringence. Therefore, in a further preferred embodiment, the present invention covers fibres that guide light in two substantially, non-degenerate polarization states. To quantify the splitting of the polarizations states, the invention covers preferred embodiments, where the fibre birefringence is at least $10^{-5}$, such as at least $10^{-4}$, such as at least $10^{-3}$.

To control the degree of birefringence, it is preferred to have fibres with a core region having either small or large degree of asymmetry. This asymmetry may be obtained either by positioning of the core features in an asymmetric manner, in an otherwise symmetric core region, or by having an asymmetry in the actual shape of the core region. Naturally, combinations of the afore-mentioned cases may also be employed. By asymmetry is here meant a deviation away from a circular symmetric shape or away from a quadratic, a hexagonal or a symmetric, higher order polynomial shape. Hence, an elliptical shape will be of interest to control birefringence. The present invention, therefore, covers preferred embodiments with the above-described manners of applying asymmetry to the core region.

Fibres according to the present invention will often have a solid overcladding surrounding the micro-structured cladding and core regions. Typically, this overcladding will consist of silica having a higher refractive index than the micro-structured cladding region in order to strip off cladding modes.

In the above-described preferred embodiments, it has been assumed that the core and cladding features have a lower refractive index than the core and cladding material (the background material of these regions). The reason for this is that micro-structured fibres commonly are fabricated such that the cladding features are voids such as air holes. Hence, the cladding features have a lower refractive index than the surrounding background material.

In further preferred embodiments, fibres according to the present invention have a part of the core containing a higher refractive index. This is advantageous when splicing micro-structured optical fibres to other optical fibres. Thus, the aspects of the invention also cover embodiments in which the core region comprises a core part or a core feature with a higher refractive index than any material surrounding said core part or feature. Here, the part of the core or the core feature containing a higher refractive index may have a diameter of less than 2 μm, such as less than 1 μm.

In preferred embodiments, an optical fibre according to the present invention are used in compact modules, where the fibre is coiled to a relatively small radius, such as smaller than 20 cm, such as smaller than 15 cm, or such as smaller than 10 cm. Due the improved macro-bending properties of fibres according to the present invention, the fibres may also be used at coiling radil around 6 cm or even less such as around 1 cm or smaller.

In yet other preferred embodiments, an optical fibre according to the present invention is used for dispersion compensating and/or dispersion slope compensating applications in a telecommunication system.

BRIEF DESCRIPTION OF THE DRAWINGS

FIG. 15 shows schematically a possible fabrication method for realizing fibres according to the present invention.

DETAILED DESCRIPTION OF PREFERRED EMBODIMENTS OF THE INVENTION

In the proceeding text, the invention will be described by way of example using selected preferred embodiments.

Figure 1:
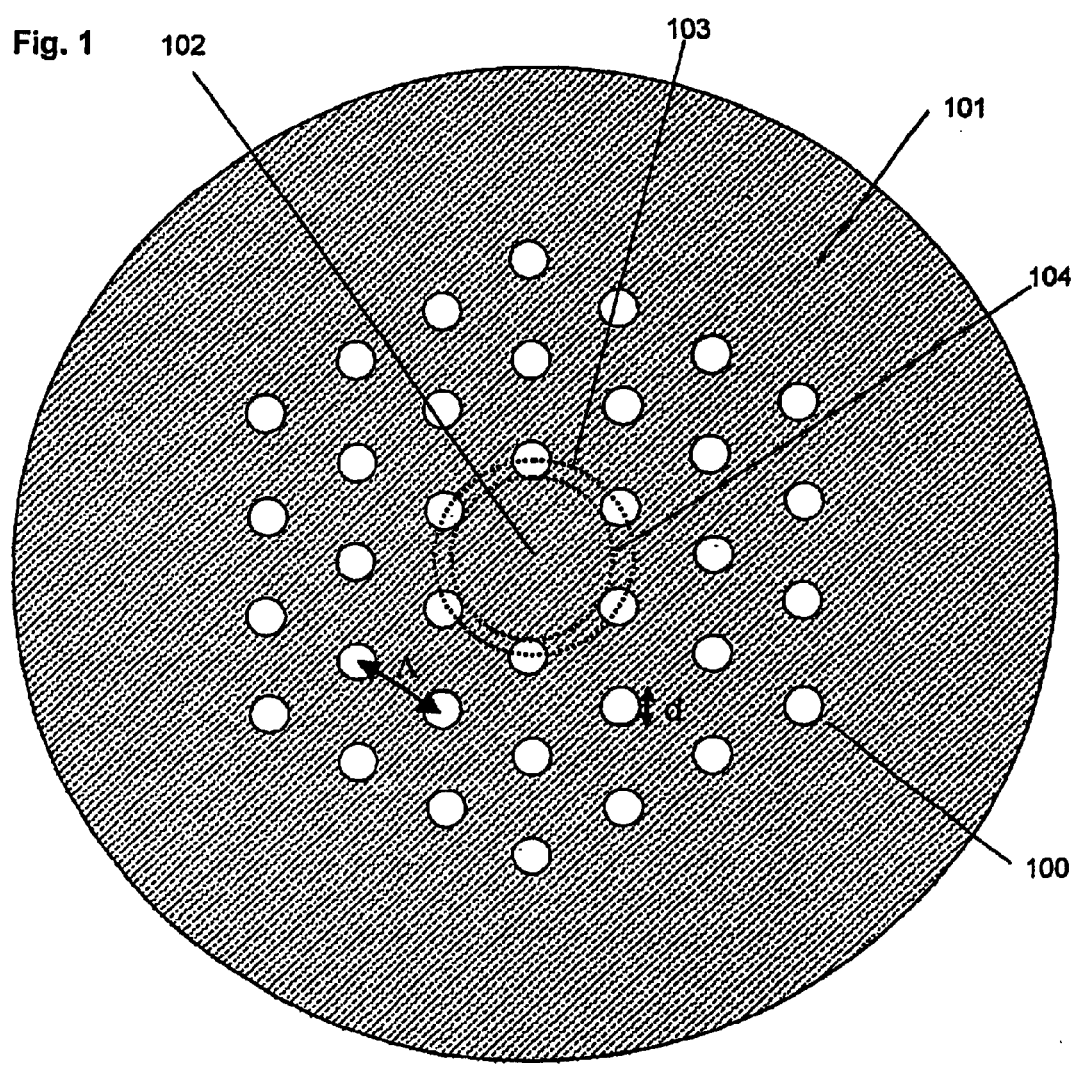
FIG. 1 illustrates schematically the design of a typical micro-structured fibre known from the prior art.

In the prior art, micro-structured fibres with endlessly single mode behaviour have been based on a design as schematically shown in FIG. 1. The figure shows the cross-section of a fibre that is assumed invariant in the longitudinal direction. The fibre has a triangular arrangement of air holes 100 in a silica background material 101 and a single missing air hole in the centre to form the core of the fibre 102. The outer part of the cladding region does not need to be micro-structured, and this figure shows an example of a fibre with a solid overcladding formed from the same material as the background material 101. The cladding holes have a spacing Λ and a diameter d. The filling fraction of the fibre—or rather of the micro-structured part of the cladding—may be determined directly from an inspection of the fibre morphology. For periodic micro-structures, the filling fraction, f, is directly related to d/Λ (for a triangular feature arrangement f is equal to $p/(2*sqrt(3))*(d/\Lambda)^2$). In the prior art, the core diameter has been defined using the circular ring 103 (see WO 99/00685). We will predominantly use this definition of the core diameter, although for certain fibres it may be more relevant to describe the core using the circular ring 104. The ring 104 is defined as the largest circular part of the core region that only contains high index material. When using the term high index material here, we mean in comparison with the index of the cladding feature material(s). To describe the core using 104 instead of 103 may be more relevant in the case of fibres with large air holes as well as it is more relevant for specific aspects of this invention, as will be discussed at a later stage in this application. We label the diameter of the ring 104 the inner diameter and it should be noticed that the inner diameter from 104 is always smaller than the diameter from 103. Unless otherwise stated, by core diameter, we will refer to the core diameter defined using 103. For micro-structured fibres with vanishing air hole sizes, the two diameters will be almost identical, whereas for micro-structured fibres with a design as shown in FIG. 1 and largest possible circular, air holes ($d_i=\Lambda_i$), the inner diameter from 104 will approximately be equal to half the diameter 103, hence the diameter 103 it will approximately be equal to Λ. It is further important to notice that for designs shown in the prior art of large mode area, micro-structured fibres, the inner diameter 104 is significantly larger than Λ.

Figure 2:
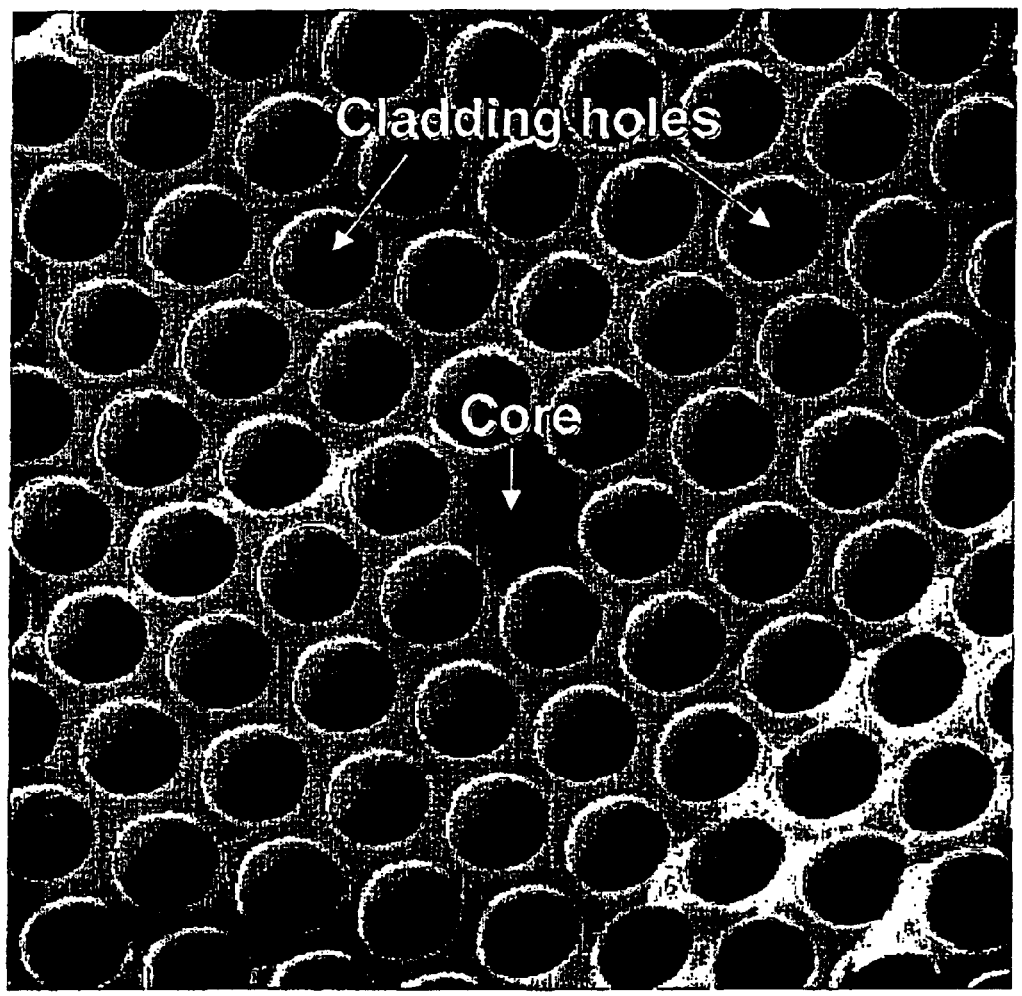
FIG. 2 shows a scanning electron micrograph of a real, micro-structured fibre with a design known from the prior art.

In order to fabricate micro-structured fibres, a number of capillary tubes and solid canes are stacked together to form a preform. This preform is then drawn into optical fibre using a conventional drawing tower. Usually, micro-structured fibres with a solid core, which are guiding light by use of TIR, are fabricated by way of a solid cane in the centre of the preform to form the core. An example of a fibre realised using the prior art fabrication technique is illustrated in FIG. 2. The present inventors have realised that it is not a requirement to fabricate high-index core micro-structured fibres using one or more solid canes to form the core region. In contrast, the present inventors have realized that it may be advantageous to form the core from one (or more) capillary tubes that collapse completely during drawing of the fibre. Such a fabrication method may provide single-mode, large-mode areas fibres with lower macro-bending losses than the previously known micro-structured fibres, as shall be demonstrated later in this description of the invention.

Figure 3:
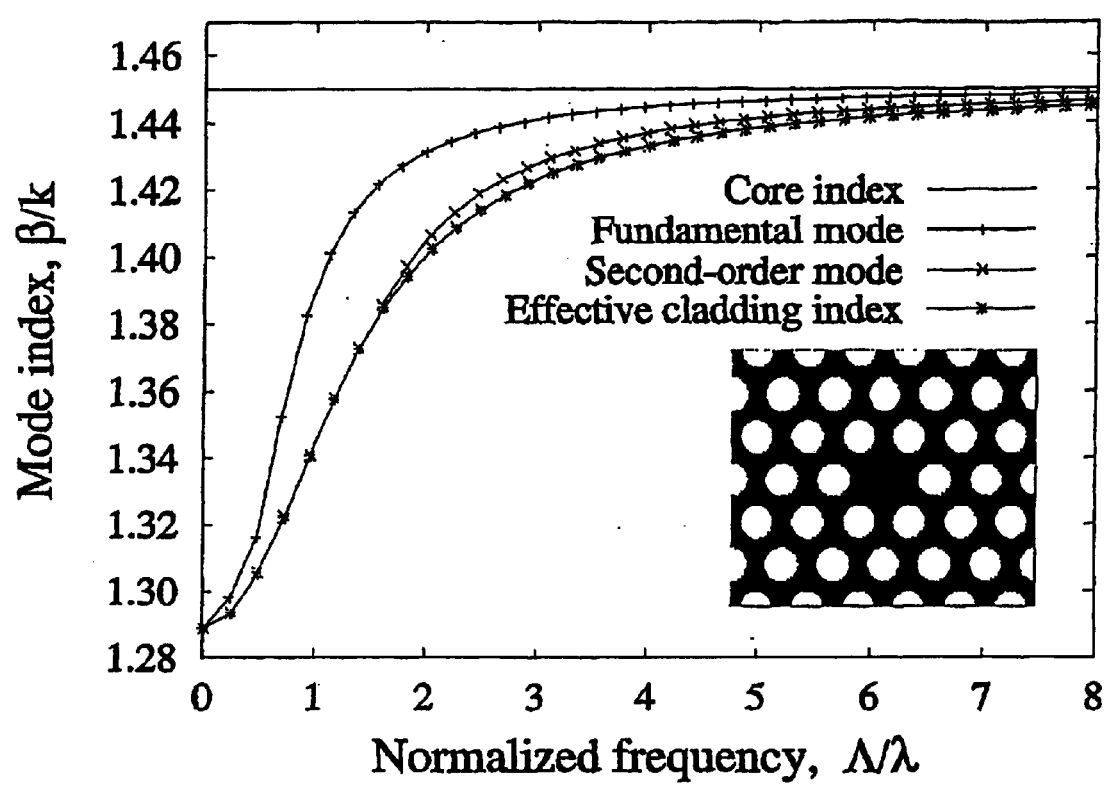
FIG. 3 shows the cut-off properties of a prior art, micro-structured fibre.

Before presenting fibres according to the present invention, it is necessary to consider the cut-off properties of prior art, micro-structured fibres. FIG. 3 presents an analysis of a fibre with a design as shown schematically in FIG. 1. The fibre has d/Λ=0.6 and it is seen only to be single mode up to normalized frequencies of around 1.5. We use normalized frequencies, Λ/λ, as the properties of micro-structured fibres may be scaled to a given wavelength range by scaling the dimension of the micro-structure. For a fibre with Λ=4 μm (a core diameter of 8 μm), the fibre will be multi-mode for wavelengths shorter than 2.6 μm. Hence, for applications within the usual telecommunications spectral ranges (near-infrared wavelengths between 1.3 μm and 1.6 μm), this fibre will not be suitable (although it has a relatively large mode area).

Figure 4:
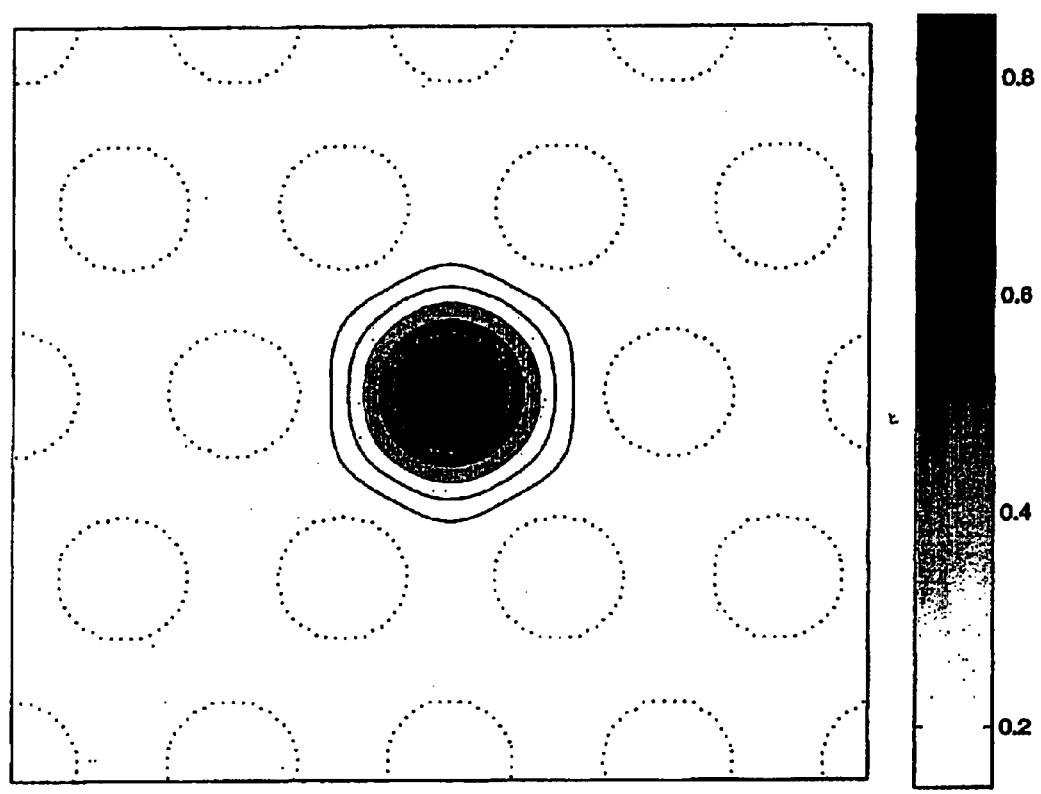
FIG. 4 shows the mode field distribution of the fundamental mode of a micro-structured fibre.
Figure 5:
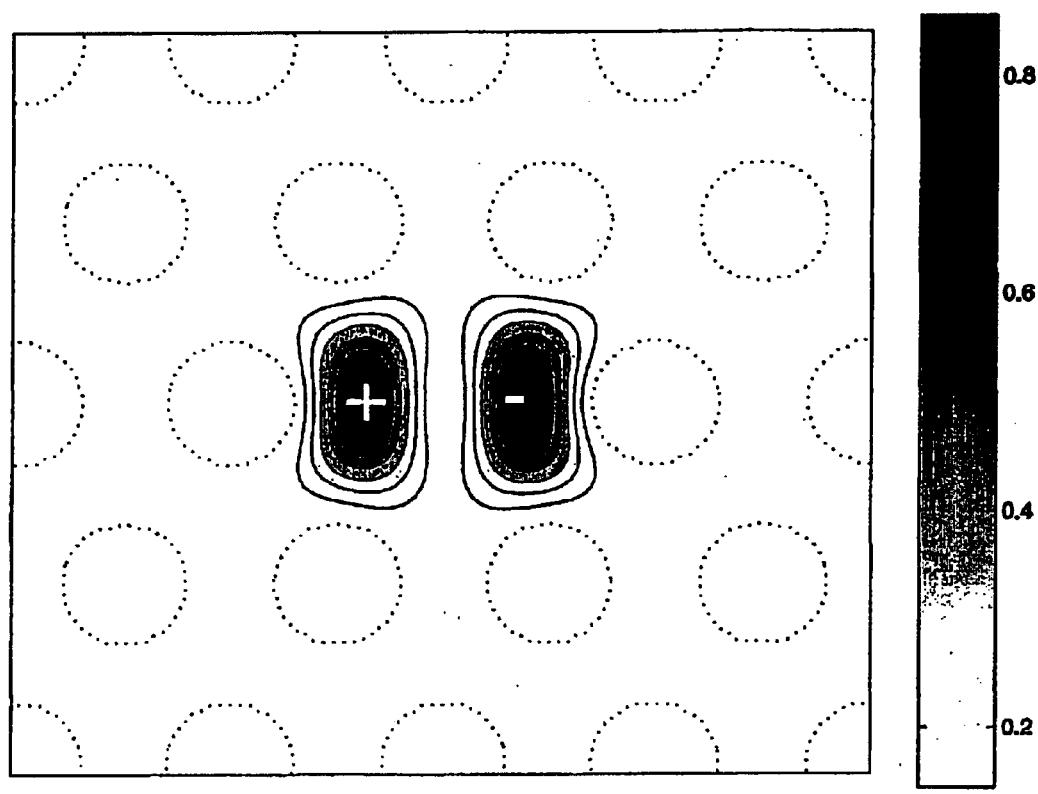
FIG. 5 shows the mode field distribution of the second-order mode of a micro-structured fibre.

The fundamental and the second-order mode of the fibre analysed in FIG. 3 are shown in FIG. 4 and FIG. 5, respectively. As known, from the literature, the fundamental mode of the micro-structured fibre closely resembles the fundamental mode of a conventional fibre. Also the second-order mode resembles that of conventional fibres, having a 180 degrees phase reversal between the two field lobes (indicated by the plus and minus signs).

Figure 6:
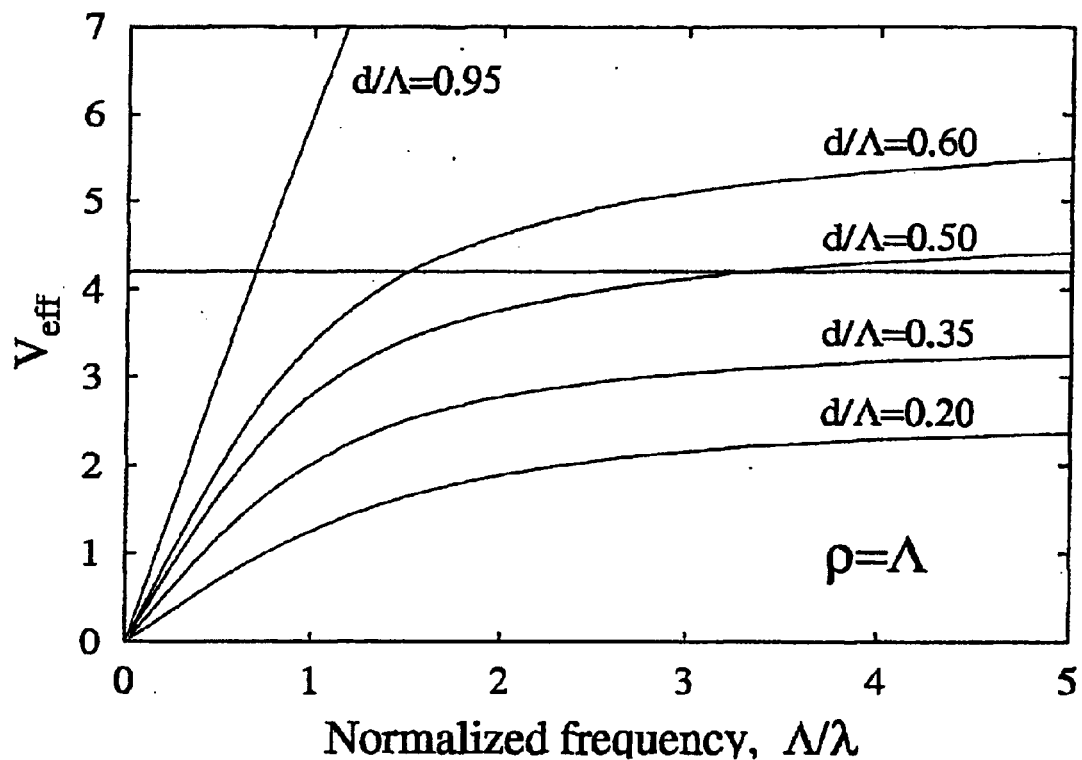
FIG. 6 illustrates the effective frequency, V, as a function of normalized frequency for a prior art fibre.

A useful tool for the characterization of micro-structured fibres that have been used extensively in the literature, and which we will also use to demonstrate some of the advantages of fibres according to the present invention, is an illustration of the so-called effective frequency, V, as a function of normalized frequency. This tool has e.g. been used by Birks et al. to demonstrate that micro-structured fibres may be endlessly single mode (see Birks et al. Optics Letters, July 1, 22(13), pp. 961–963, 1997). FIG. 6 shows the effective V for a series of micro-structured fibres with a design as shown in FIG. 1. As well known from the literature, the fibres exhibit a second order mode cut-off at around V=4.2 (using the effective V definition in the above-cited Birks reference). As is also well known from the literature, and as directly observable from FIG. 6, fibres with d/Λ smaller than 0.45 (corresponding to a filling fraction of 18%) will have V lower than 4.2 and are, consequently, endlessly single mode—meaning that the fibres can be designed with a large mode area and remain single mode. Fibres with larger cladding features cannot be classified as endlessly single mode and they will become multi mode for large core sizes. It is, therefore, relevant to introduce the term "critical filing fraction"—or critical hole diameter—as the largest possible filling fraction that can be used for endlessly single mode fibre. For the prior art fibres this critical filling fraction is, therefore, equal to 18%—or the critical air hole diameter is d=0.45Λ. As an example of a fibre with hole size above 0.45Λ, it is here chosen to look at a fibre with d/Λ=0.50. This fibre has a cut-off around Λ/λ=3.5, hence for operation around 1.55 μm, the maximum dimensions for the fibre under single-mode operation that can be tolerated is for Λ=3.5*1.55 μm or about 5.4 μm. This corresponds to a core diameter defined using 103 of around 10.8 μm and an inner core diameter defined using 104 of around 8.1 μm (the inner diameter being equal to 2Λ−d for this type of fibre design).

Figure 7:
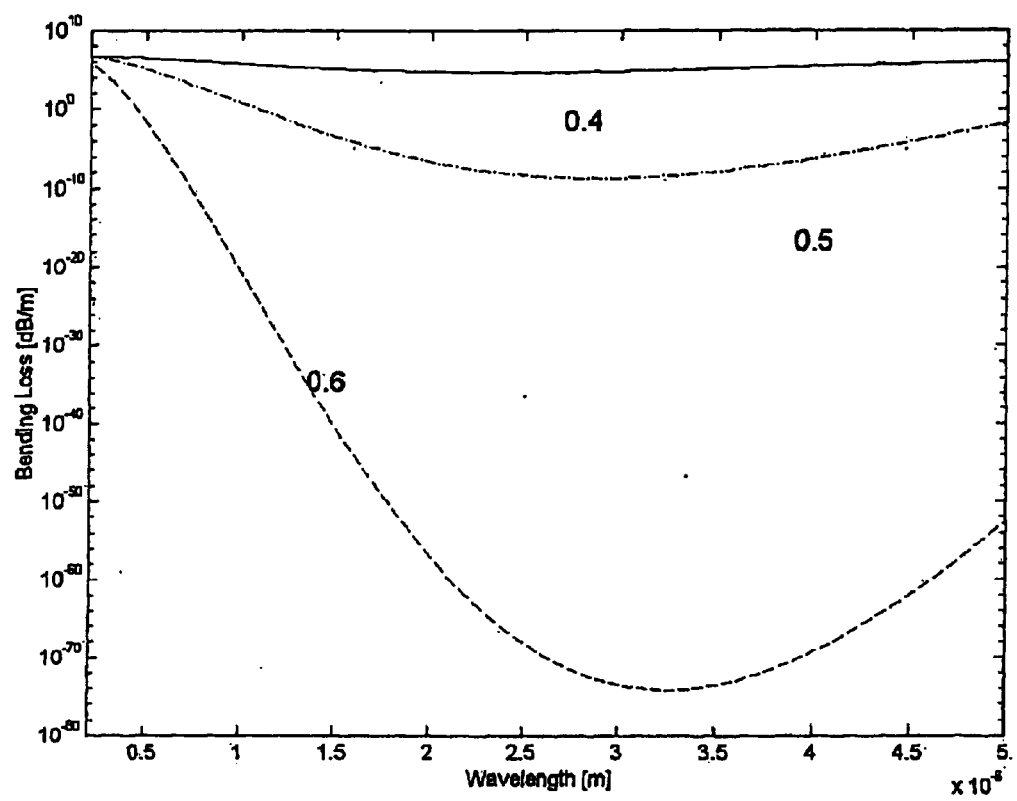
FIG. 7 illustrates the macro-bending losses of prior art fibres with d/Λ=0.4, 0.5, and 0.6.

In order to address the robustness of micro-structured fibres directly, FIG. 7 illustrates the macro-bending losses of prior art fibres with d/Λ=0.4, 0.5, and 0.6. The fibres have the same design as previously analysed and the cladding feature spacing is Λ=4 μm—resulting in a core diameter from 103 of 8 μm and an inner core diameter from 104 of 6.4 μm, 6.0 μm, and 5.6 μm, respectively for d/Λ=0.40, 0.50, and 0.60. The bending losses are simulated for a bending radius of 6 cm (a representative value for presently used fibre drums for e.g. dispersion compensating modules) and a method as described by Broeng et al. (see Optical Fiber Technology, Vol. 5, pp. 305–330, 1999) has been employed. The figure shows that the large mode area endlessly single mode fibres with d/Λ=0.4 is highly sensitive to bending losses—much more than fibres with d/Λ larger than 0.5. The losses are higher than $10^4$ dB/m over the whole wavelength range of interest (λ=0.3 μm to 2.0 μm) making it unusable for most practical applications as a large mode area fibre. Fibres with even smaller air holes than d/Λ=0.4 have even higher losses (these are not shown in the figure for reasons of clarity). While the prior art fibre with large cladding features d/Λ=0.6 is robust over a wide wavelength range, it is, however, not single mode for wavelength shorter than 2.6 μm (see FIG. 3) and this prior art fibre is, therefore, unusable in telecommunication systems. The figure gives us the important information that the robustness—in terms of macro-bending losses—of micro-structured fibres is very sensitive with respect to air hole size in a range around d/Λ=0.4 to 0.5. For smaller air holes, the fibres are highly sensitive to bending losses, whereas for larger air holes the fibres are practically insensitive to bending losses. As those skilled in the art will recognise, the exact bending loss at a given wavelength is depended on the exact feature spacing. As in the case of the cut-off properties, the macro-bending loss properties may be scaled to a given wavelength by scaling the fibre dimensions. Hence, for large mode area fibres, the high sensitivity around d/Λ=0.4 as discussed above is valid for the fibres in the wavelength range of interest.

Figure 8:
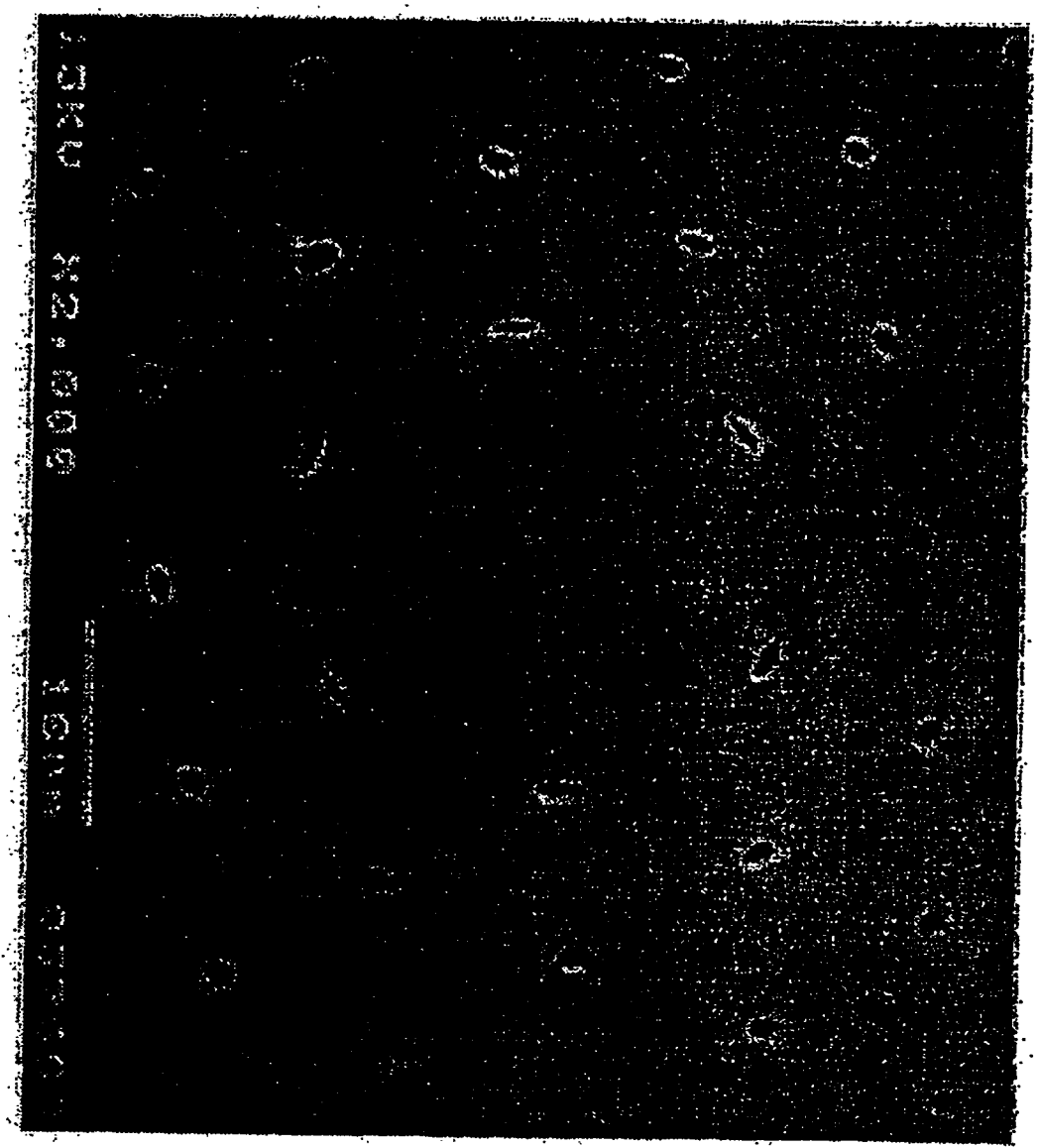
FIG. 8 shows a micrograph of a large-mode area fibre realize using the prior art fabrication method (picture taken from Birks et al. Electronics Letters, June 25, 34(13), pp. 1347–1348, 1998).

Having demonstrated the principle limitation to presently known large mode area, micro-structured fibres, we turn to address the large-mode area, micro-structured fibres that have been demonstrated experimentally in the literature. It is worth emphasizing that the experimentally realized large mode area, micro-structured fibres have, in fact, been even more bending sensitive than shown in the discussion above. FIG. 8 shows a micrograph of a large-mode area fibre realize using the prior art fabrication method (picture taken from Birks et al. Electronics Letters, June 25, 34(13), pp. 1347–1348, 1998). The filling fraction is very low (d/Λ around 0.12). The fibre has a core diameter of around 22.5 μm and a cladding feature spacing, Λ, of around 9.7 μm. The fibre is experimentally verified to be single mode at 458 nm (corresponding to a normalized frequency, Λ/λ, of around 22). It is important to notice that the fibre has a core diameter that is slightly larger than two times Λ, and the inner cladding features are elongated in directions surrounding the core. These two characteristics of the fibre are attributed to the fabrication method (see e.g. Knight et al. Optical Materials, Vol. 11, pp. 143–151, 1999), where the core is formed from a solid cane at the preform level. Due to collapsing holes in the cladding—most strongly pronounced near the core—the core effectively increases in size with respect to the cladding pitch, compared to the core size at the preform level.

Figure 9:
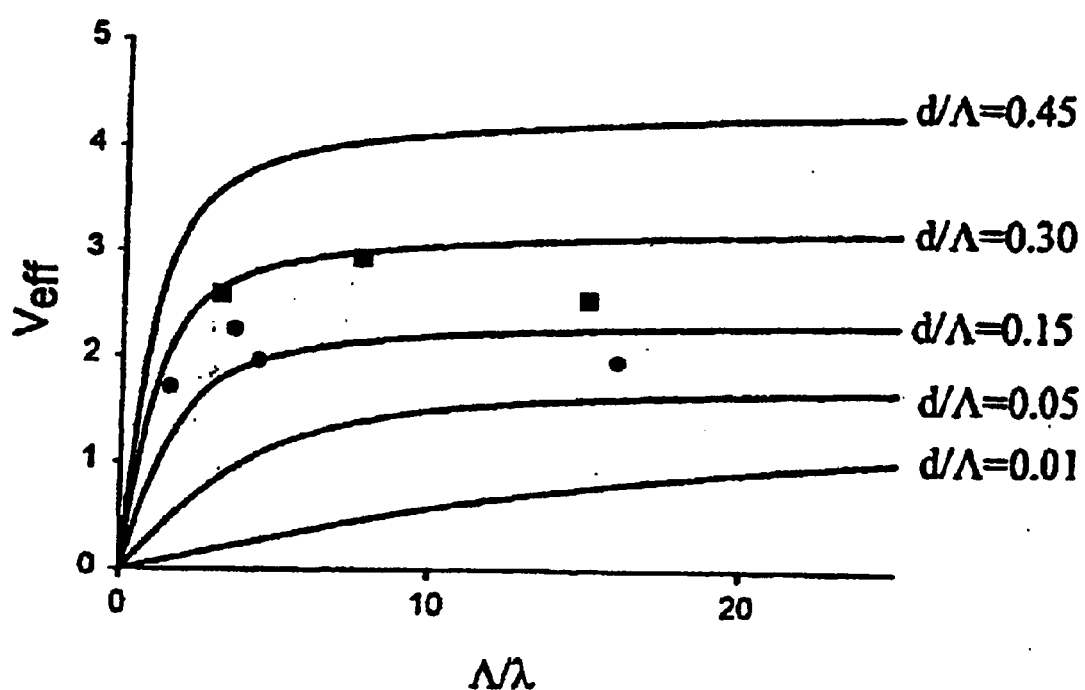
FIG. 9 illustrates the effective frequency, V, as a function of normalized frequency for a series of fabricated prior art fibres.

FIG. 9 illustrates the effective frequency, V, as a function of normalized frequency as in FIG. 6. The figure is taken from Knight et al. J. Opt. Soc. Am. A. 15(3), pp. 748–752, 1998, and it illustrates the theoretical cut-off properties of prior art fibres with a design as shown in FIG. 1 (solid lines—as in FIG. 6) as well as experimentally obtained result on prior art fibres with designs reminiscent of that of FIG. 8 (circles and squares). Circles indicate fibres that are single mode and squares indicate fibres that are multi mode. It is found that for the realized prior art fibres, the aforementioned critical filling fraction is in fact very low, namely f less than 4% (d/Λ less than 0.2). This means that realized large mode area fibres in the prior art are very sensitive to bending losses—see FIG. 7. The present inventors have realized that the decrease in critical filling fraction of the fabricated, prior art fibres is attributed to the increase in core diameter relative to feature spacing compared to the design in FIG. 1, where the core diameter from 103 is exactly equal to two times the feature spacing, Λ.

Figure 10:
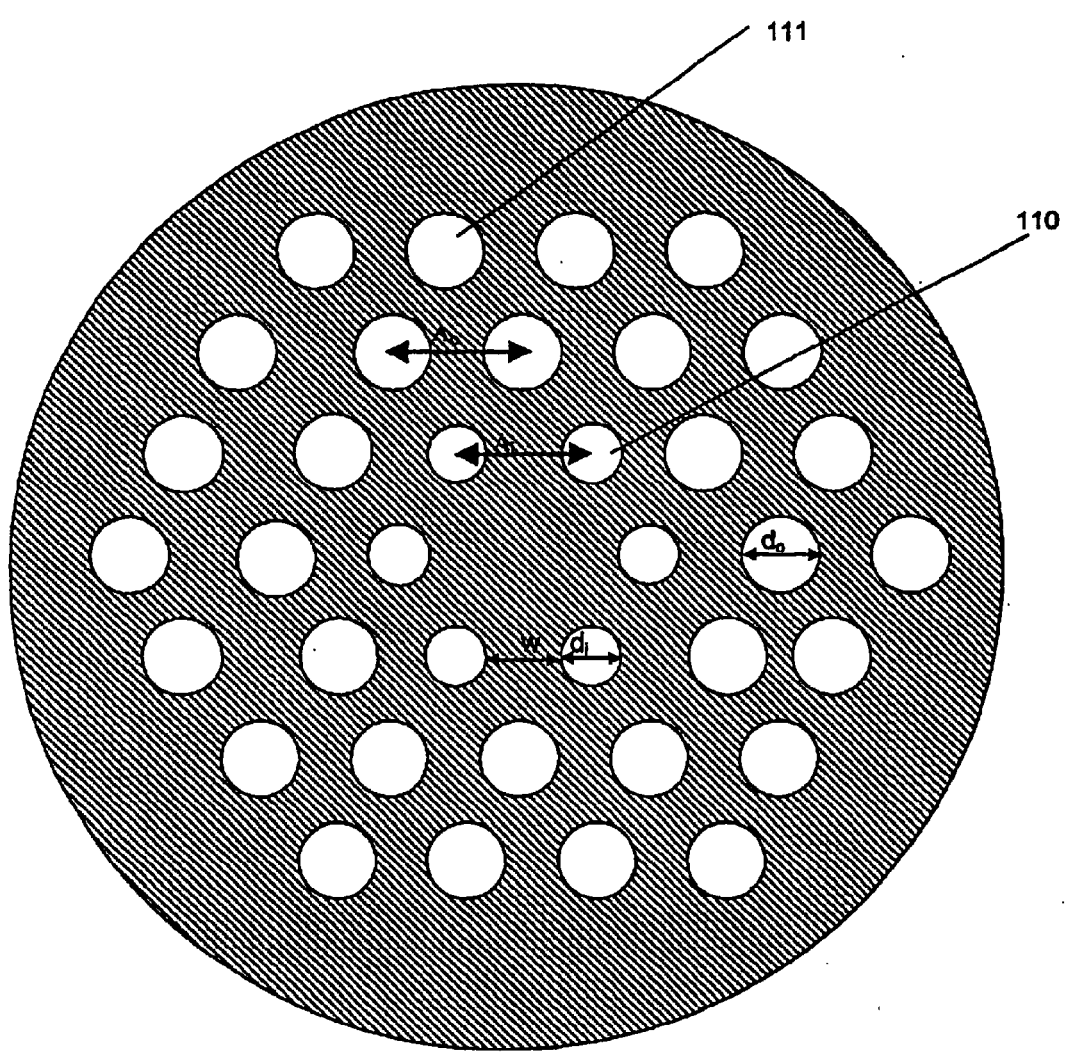
FIG. 10 shows schematically the cross-section of a fibre according to the present invention. The inner cladding features have a diameter of $0.45\Lambda_i$ and the outer cladding features have a diameter of $0.55\Lambda_o$.

In order to understand the present invention, it is valuable to consider micro-structured fibres where the cladding is divided into (at least) two concentric cladding regions—an inner and an outer cladding region—each having micro-structured features. FIG. 10 shows an example of a fibre according to the present invention. The fibre has circular cladding features 110 and 111 and the diameter, $d_i$, of the inner cladding features 110 are kept at a level around the critical diameter for endlessly single mode operation, i.e. a diameter, $d_i$, of around $0.45\Lambda_i$, where $\Lambda_i$ is the centre-to-centre spacing between two inner cladding features. To improve the bending loss characteristics, the outer cladding features 111 have a larger diameter than the inner cladding features—in this example the outer cladding features have a diameter, $d_o$, of around $0.55\Lambda_o$, where $\Lambda_o$ is the centre-to-centre spacing between two outer cladding features. Through advanced numerical simulations, the present inventors have found that for silica-air micro-structures, the outer cladding features being closest to the inner cladding region should have a diameter that is not larger than $0.6\Lambda_o$, for the fibres to remain single-mode at large core sizes. For $d_o=0.55\Lambda_o$, fibres with a design as in FIG. 10 where found to remain single mode for core diameters (defined using 104) up to 35 μm—and possibly larger cores may be made.

Depending of the refractive indices of the materials composing the micro-structured fibre (the core and cladding background materials and the feature materials), the above-mentioned diameter ranges may vary. For silica and air structures, which are today the most employed material choice for large-mode area micro-structured fibre, the present inventors have found that the relevant range of diameters are $d_i=0.40\Lambda_i$ to $0.45\Lambda_i$ for the inner cladding features and $d_o=0.50\Lambda_o$ to $0.60\Lambda_o$ for those outer cladding features that immediately surround the inner cladding features. For other materials, such as for example polymers that provide a larger range of refractive indices, these range may be broader, such as $d_i=0.35\Lambda_i$ to $0.50\Lambda_i$ and $d_o=0.50\Lambda_o$ to $0.90\Lambda_o$.

The present inventors have also realised that further away from the centre of the core, the outer cladding features may have a size that is larger than $0.6\Lambda_o$ while the fibre remains single-mode for large core sizes. It may be understood that the further away from the core the outer cladding features are, the smaller is their influence on the cut-off properties of the fibres. On the other hand, the increase in diameter of the outer cladding features compared to the inner cladding features, results in a larger air filling fraction, that provides improved macro-bending loss properties.

Figure 11:
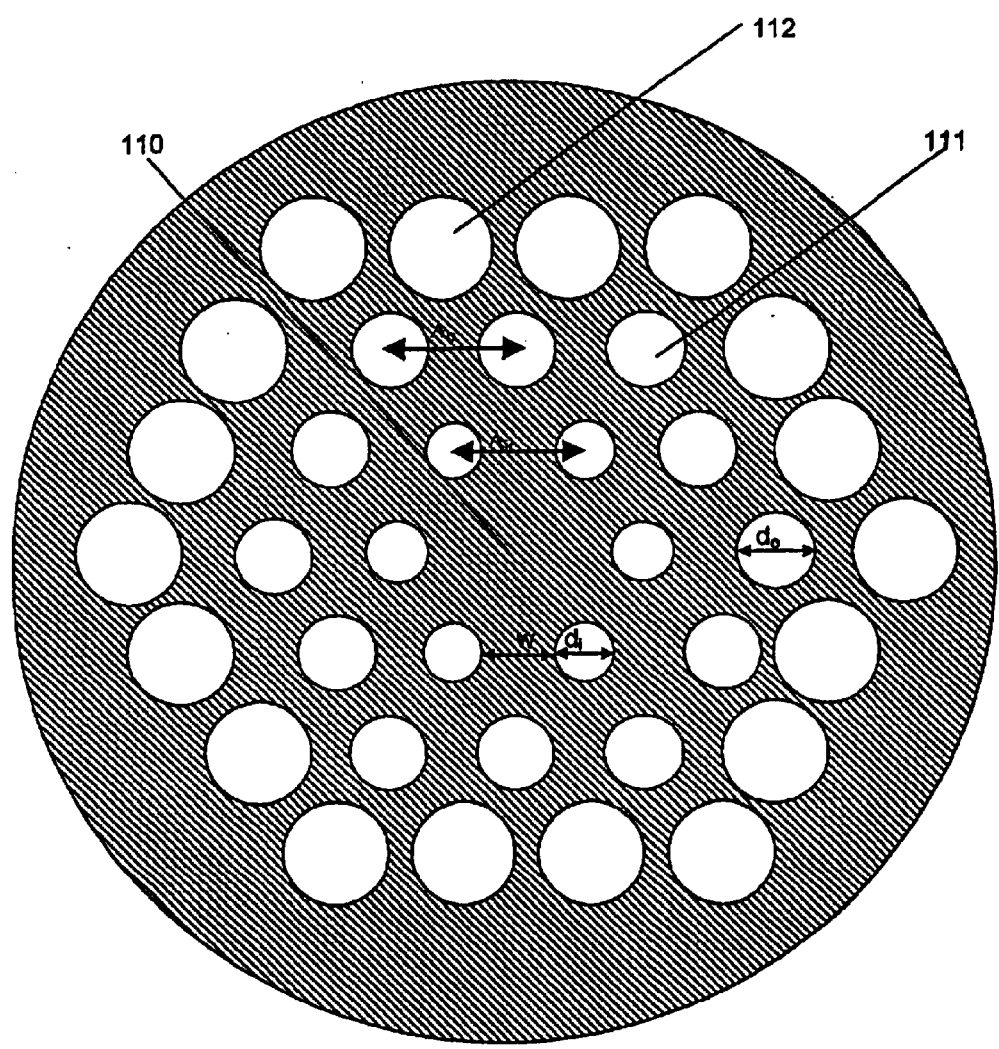
FIG. 11 shows schematically the cross-section of a fibre according to the present invention. The inner cladding features have a diameter of $0.45\Lambda_i$ and one part of the outer cladding features have a diameter of $0.55\Lambda_o$ and a second part of the outer cladding features have a diameter larger than $0.6\Lambda_o$.

FIG. 11, illustrates fibres according to the present invention, where the outer cladding features increase in size away from the core centre 110—as seen, outer cladding features 111 are larger than outer cladding features 112. Outer cladding features that are positioned furthest away from the core may have diameters, $d_o$, of up to $0.9\Lambda_o$.

The present inventors have also realized that large-mode area fibres may not be fabricated using a method where one (or more) solid cane(s) is used to form the core. In contrast to this, the present inventor have realized that fibre designs, where the core diameter as defined from 104 is smaller than $2\Lambda_o$—preferably it is much smaller—are advantageous for large mode area fibres with respect to robustness and single mode operation. A detailed discussion of the advantages of such fibres shall be presented in the proceeding sections, as well as a method of making such fibres shall be described.

Figure 12:
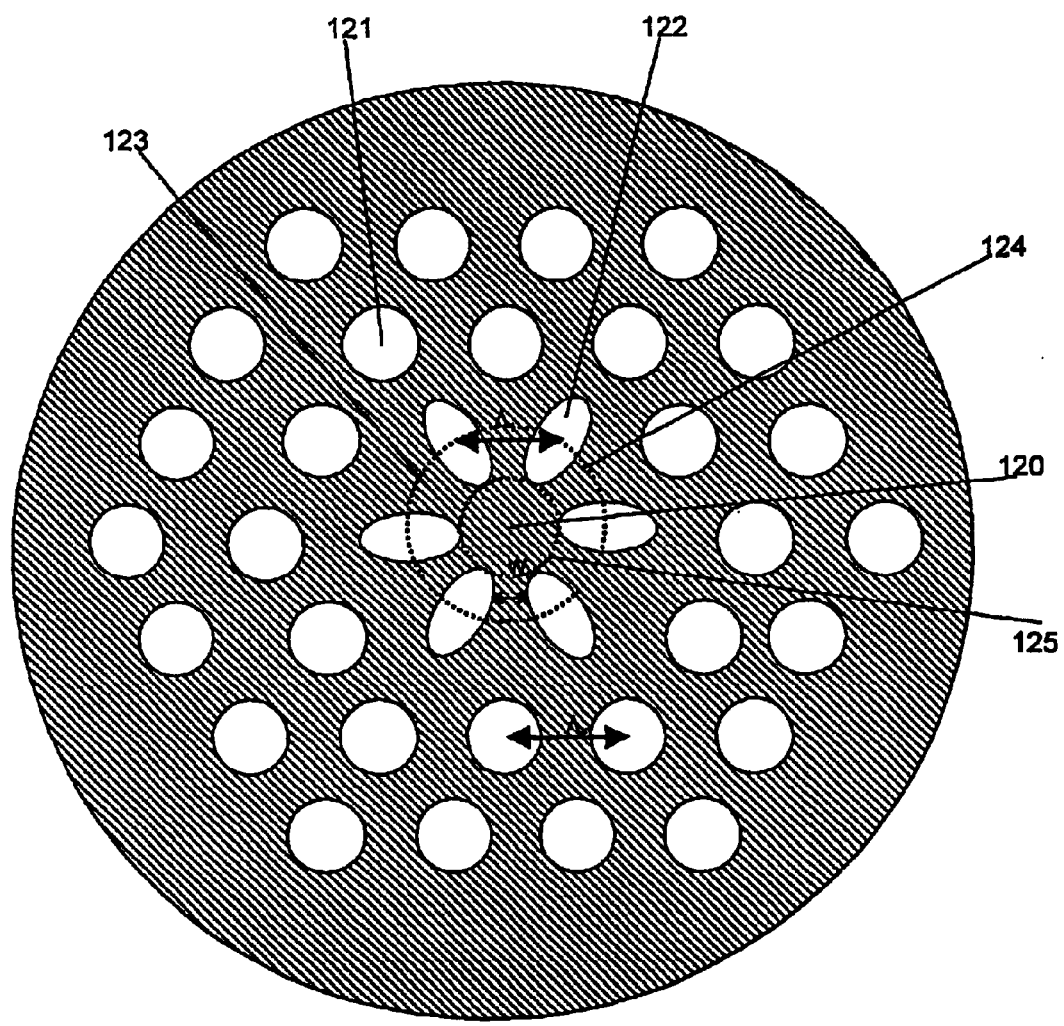
FIG. 12 shows schematically the cross-section of another fibre according to the present invention where the inner cladding features are oriented towards the centre of the core.

Another schematic example of a fibre according to the present invention is illustrated in FIG. 12. The fibre has a core 120 with a diameter that is larger than 4 μm, it has a micro-structured outer cladding with outer cladding features 121 providing an outer filling fraction of more than 18%, and it is guiding light in a single mode in the wavelength range considered for this invention, namely 0.3 μm to 2.0 μm. The inner cladding features 122 have a non-circular shape. The inner features 122 are oriented towards the centre of the core. The orientation of the elongated features may provide a bridging width, w, of around $0.55\Lambda_i$ that ensures that higher order modes are suppressed while a larger maximum dimension of the inner cladding features than $0.45\Lambda_i$ can be obtained. In this manner, an inner cladding region with an air filling fraction of more than 18% can be obtained while the fibre is single mode. The larger air filling fraction is advantageous in order to lower macro-bending losses—as previously described. Intuitively, the advantage of this orientation of the features (usually air holes) compared to circular-shaped features may be understood such that it enables light in higher order modes to "escape" through the relatively large bridging areas 123 of minimum width, w, that contain material with a refractive index comparable to the refractive index of the core region. In this respect, the worst orientation would be such that the bridging areas were narrowed. This worst-case orientation is, however, exactly the case of the prior art, experimentally demonstrated large mode area fibre shown in FIG. 8. In order for the bridging areas 123 to be as wide as possible for a given filling fraction it is, therefore, optimum to orientate the cladding features 111 so as to point towards the core centre—or in other words, an orientation towards the centre of the core allows the largest possible filling fraction, when a certain bridging width is required.

The bridging width, w, of a prior art fibre with a design as shown in FIG. 1 can be determined as w=Λ−d/Λ. Hence, the prior art fibres, where a maximum d/Λ value of around 0.45 can be tolerated (corresponding to a filling fraction of 18%) in order for the fibre to be single mode, the minimum bridging width, w, is 0.55Λ. According to the present invention, it is, however, advantageous to have a filling fraction larger than 18% while keeping the bridging width around or smaller than 0.55Λ. While the width is here described in terms of the cladding feature spacing, it may also be appropriate to relate the width to the core diameter defined using the ring 124 (similarly defined as 103) (especially for non-periodic micro-structures). It is directly realized that the bridging areas should not be smaller than w=0.55ρ/2, where ρ is the core diameter defined using 124. This relation may also be stated in terms of $\Lambda_i$, where it would state: w equal to or larger than $0.55\Lambda_i$. The present invention, therefore, includes preferred embodiments, where the fibres have bridging areas with width, w, of around $0.55\Lambda_i$ and filling fractions larger than 18% for the outer cladding region and preferably also for the inner cladding region. For a fibre core diameter of 4 μm or larger, this means that w should be around or larger than 1.1 μm. It should be mentioned that the fabrication method presented in the present patent application allows fabrication of such fibres.

Since fibres according to the present application may have both large cladding features as well as an elongated shape of these, it may be more appropriate to characterize the core size using an inner core diameter as described under the discussion of FIG. 1, i.e. an inner core diameter, $\rho_{inner}$, defined using the ring 125 (similarly defined as 104) of the core 102. For the prior art large mode area fibres, the inner diameter is significantly larger than $\Lambda_i$ as well as $\Lambda_o$, whereas fibres according to the present invention may well have inner diameter less than $\Lambda_i$. Therefore, in another aspect, the present invention includes fibres with $\Lambda_i$ of at least 2 μm and an inner core diameter of at least 2 μm, but smaller than $\Lambda_i$ and preferably also smaller than $\Lambda_o$.

Other types of fibres according to the present invention may also be realised, such as fibres that have a core diameter that is larger than 4 μm, but smaller than two times the outer cladding feature spacing, $\Lambda_o$. The difference between such fibres and prior art fibres may be viewed as the inner cladding features being pushed towards the core centre—resulting in a core diameter smaller than $2\Lambda_o$.

Figure 13:
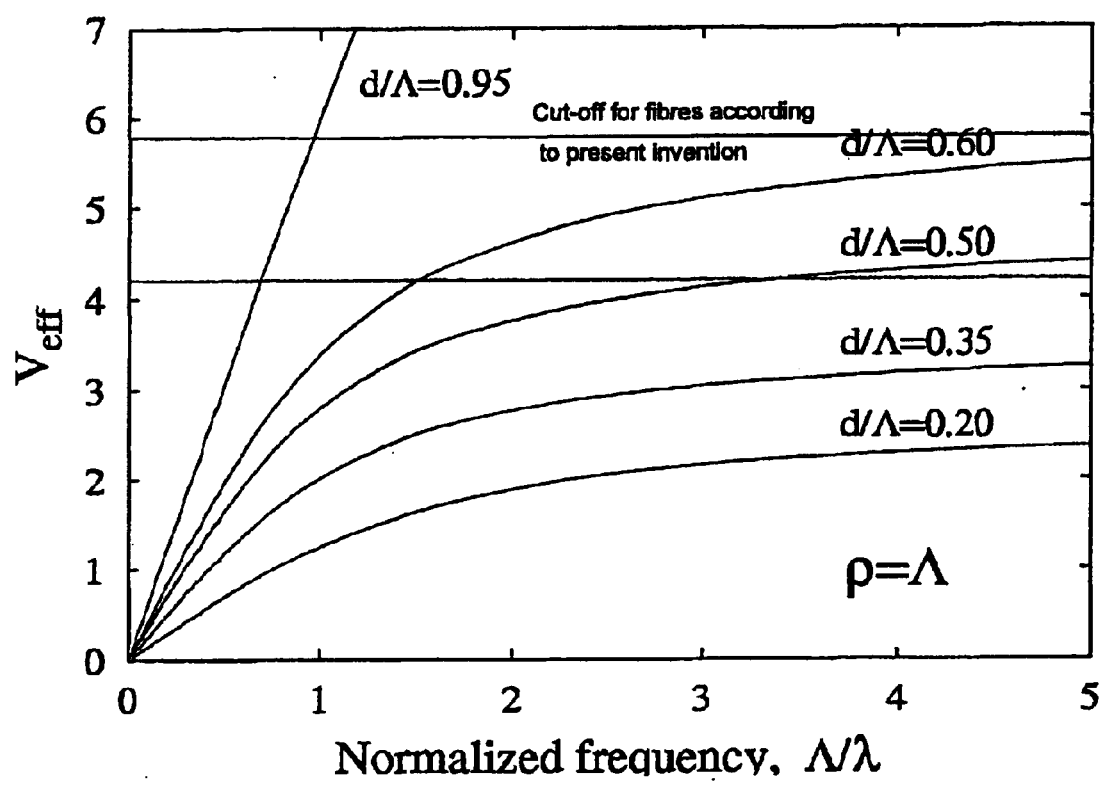
FIG. 13 illustrates schematically the effective frequency, V, as a function of normalized frequency for a series of fibres according to the present invention with a design as in FIG. 12. The second order mode cut off is pushed to higher V values for fibres according to the present invention.

The present inventors have analysed a number of fibres according to the present invention with respect to cut-off properties and bending losses. Starting with the cut-off properties for a fibre with a design as illustrated in FIG. 12, FIG. 13 illustrates the effective frequency, V, as a function of normalized frequency. For fibres according to the present invention, the second order mode cut off is found to increase to effective V value above 4.2. i.e. the fibres can be operated at higher normalized frequencies and remain single mode compared to prior art fibres. This is a strongly advantageous behaviour and it allows realization of fibres with larger mode areas than previously possible—for a given (large) filling fraction. In other words, the present inventors have found that the critical filling fraction of the new fibres is increased compared to the prior art fibres. Hence, this invention provides endlessly single mode fibres with filling fractions larger than 18%. As a result of the possibility of increasing the critical filling fraction, it becomes possible to realize fibres with core diameters of 4 μm or larger that are practically insensitive to bending losses in the wavelength range from 0.3 μm to 2.0 μm—in particular for use in the wavelength range around 1.5 μm.

It should be noted that the effective V value at a given wavelength will not be identical for a prior art fibre and a fibre according to the present invention although the fibres have identical core size and filling fractions. The effective V value is given as V=k*ρ/2*NA, where k is equal to 2π/λ, ρ/2 is the core radius, and NA is the numerical aperture of the fibre. The above-mentioned difference in V value follows from the fact that the fibres have different relations between the core diameter and the cladding feature spacing, i.e. different feature spacing for a fixed core diameter that results in different effective cladding indices. Hence, the numerical aperture of the fibres, which is strongly dependent on wavelength, will not be identical, and, therefore, the effective V value will not be identical for a given core size and a given wavelength.

Turning to the bending properties of fibres disclosed in the present invention, a fibre with a core diameter equal to $1.5\Lambda_o$ will be used as example. For an absolute core diameter of 8 μm, the fibre will have $\Lambda_o$ equal to 5.3 μm. To compare this with a prior art fibre with a core diameter of $2\Lambda$ ($\Lambda_i=\Lambda_o=\Lambda$), this would require $\Lambda=4$ μm. While this for identically sized cladding features relative to $\Lambda_o$ would render the fibres according to the present invention more sensitive to bending losses, the advantage of the fibres disclosed in this application, is that their critical filing fraction is larger than for the prior art fibres. Hereby, the new fibres may be designed with air feature sizes that cannot be tolerated in the prior art fibres. For the specific example, this means that single-mode fibre with core diameter of 8 μm and a feature size, $d_o/\Lambda_o$, of about 0.55 can be realized, whereas the prior art single-mode, large-mode area fibres can only be realized with a feature size, d/Λ, of about 0.45. Therefore, although $\Lambda_o$ for a fibre according to the present invention with a given absolute core size may be larger compared to Λ for a prior art fibre with identical core size, the increased critical air filling fraction allows the here-disclosed fibre to be designed with a larger $d_o/\Lambda_o$ and consequently to be more robust than the prior art fibre.

Figure 14:
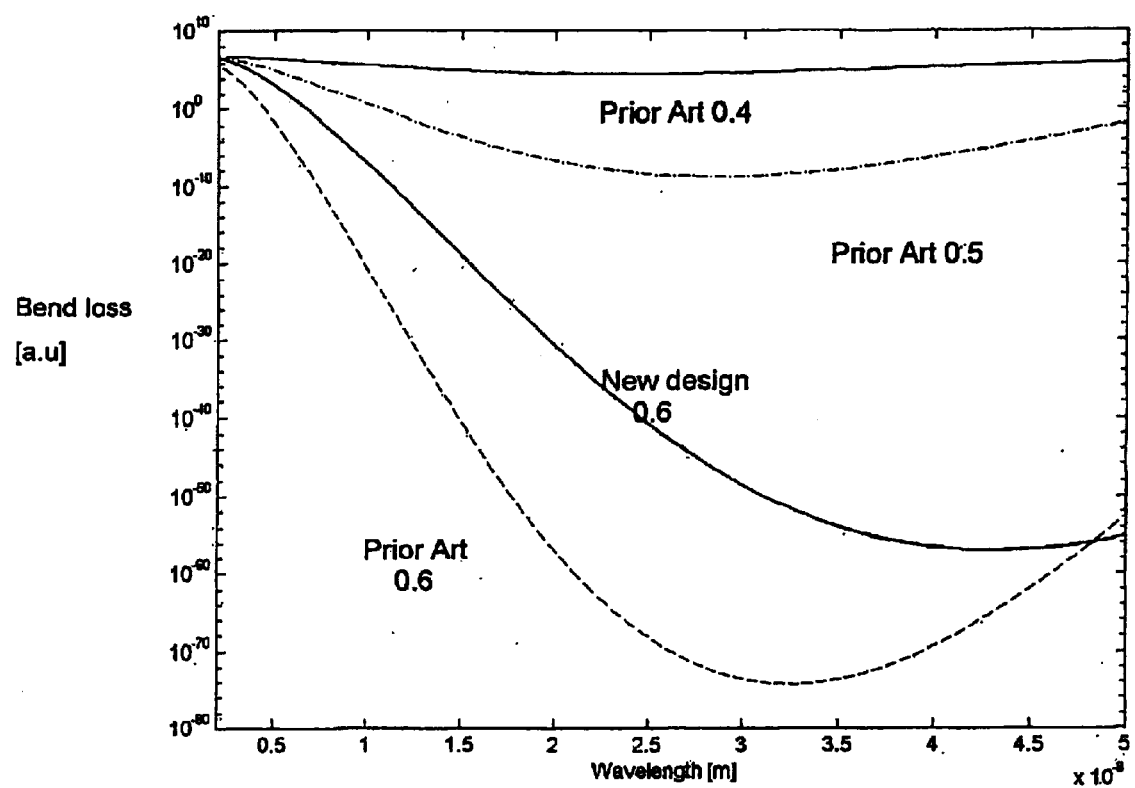
FIG. 14 shows a comparison between bending losses for three fibres with different air filling fractions.

To demonstrate the advantage of fibres according to the present invention, the bending losses should be compared for a prior art, single mode fibre with d/Λ=0.4 and core diameter of 2Λ, and a single-mode fibre according to the present invention with d/Λ=0.6 and core diameter of 1.5Λ. For a proper comparison with respect to large mode area fibres, both fibres should have identical spotsize. As a generally accepted spotsize for micro-structured fibres has not yet been defined, the comparison is made for fibres with identical core diameter—and an absolute core diameter of 8 μm has been chosen. Hence, the prior art fibre has Λ=4.0 μm and d=1.6 μm, and the fibre according to this invention has $\Lambda_o$=5.3 μm and $d_o$=3.2 μm. FIG. 14 presents schematically the details for such a comparison. As seen from the figure, the fibre according to the present invention is superior to the prior art single-mode, large mode-area fibre. Again, it should be emphasized that, the prior art fibre with d/Λ=0.6 that appears to be superior to the fibre according to the present invention, is, in fact, unusable for telecommunication applications, as it is multi mode for wavelengths shorter than 2.6 μm.

Fibres according to the present invention are characterized by cut-off properties that are different to those of prior art micro-structured fibre, in the way that single mode fibres with relatively large mode areas and filling fraction above 18% can be realized. The increased filling fraction provides increased possibility of creating strong waveguide dispersion in single mode, micro-structured fibres. Thereby the present invention provides new means for tailoring the dispersion properties of large mode area, single mode fibres. The present inventors have realised that fibres according to the present invention may be of particular interest for use in applications such as long-distance transmission, dispersion compensation, dispersion slope compensation and high power delivery over a broad range of visible wavelengths.

Figure 15A:
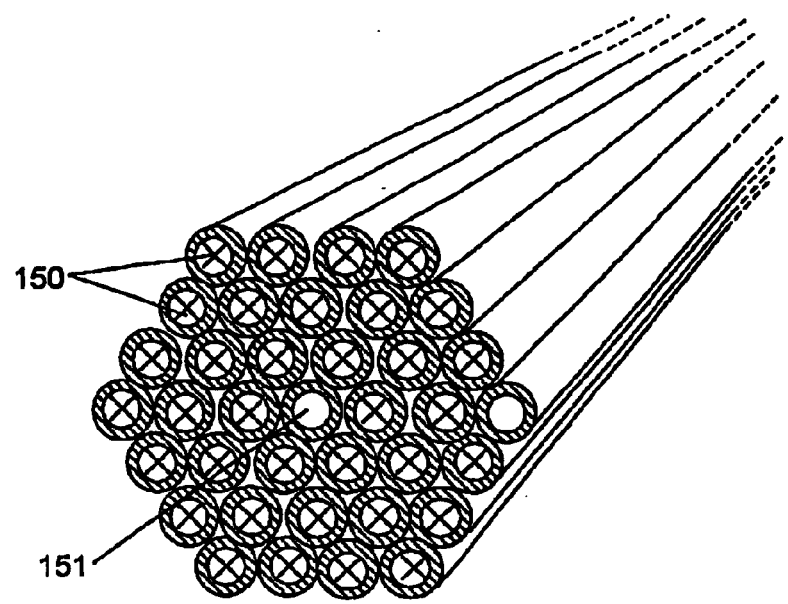
FIG. 15a shows the fibre preform and FIG. 15b shows the final fibre.
Figure 15B:
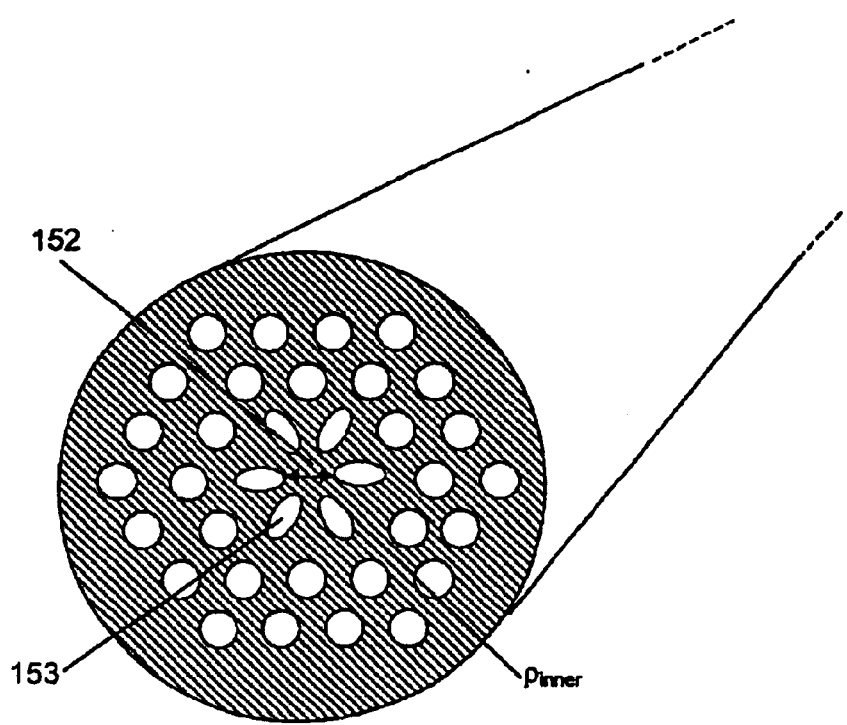

In order to fabricate the fibres of the present invention, a preform made purely from a stack of pure capillary tubes can be used—see schematic FIG. 15. At the preform level, the tubes 150 in the cladding region may be sealed in the top end, while one tube in the centre is kept open 151. During fibre drawing the central—open—tube 151 will collapse completely and provide a solid core 152 with an inner dimension, $\rho_{inner}$, significantly smaller than two times the inner cladding feature spacing. This method also provides nearest-core features 153 around the core region, that have an orientation towards the core centre, since the collapsing core-tube 151 will deform the surrounding tubes as desired.

Figure 16:
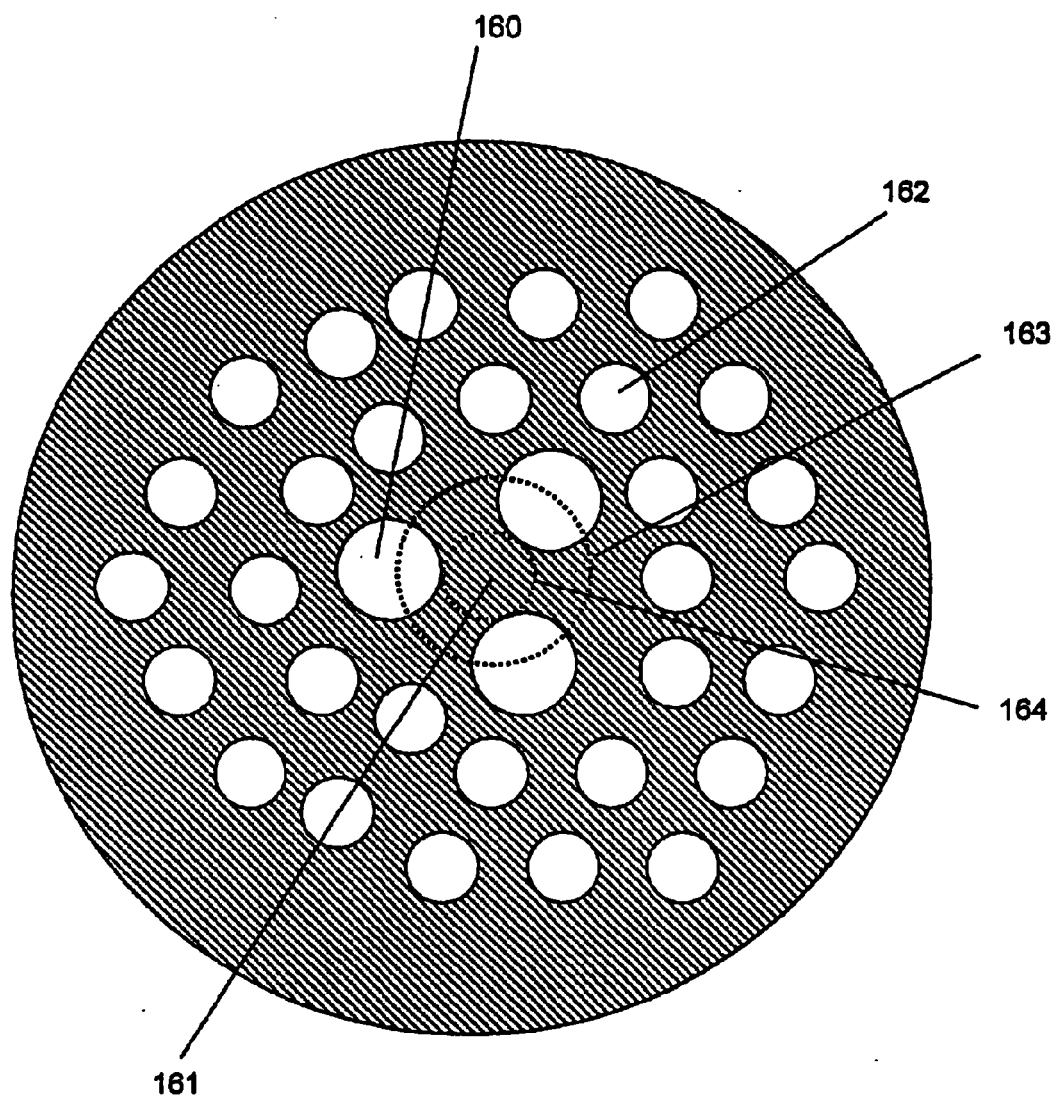
FIG. 16 shows schematically another fibre according to the present invention.

FIG. 16 shows yet another example of a fibre according to the present invention. The fibre has three relatively large inner features 160 surrounding the core 161 and smaller, more densely spaced outer features 162 in the outer part of the cladding. The features 160 have a spacing $\Lambda_i$ and the features 162 have a spacing $\Lambda_o$. The core diameter defined using the ring 163 is for this specific fibre significantly below $2\Lambda_i$—more precisely it is around $1.15\Lambda_i$. According to the present invention, the second order mode of this fibre will be significantly suppressed, and the fibre can be designed with very large features 161, while it remains single mode. In preferred embodiments, the inner features 160 have, therefore, a diameter that is significantly above $0.45\Lambda_i$, such as $0.6\Lambda_i$. For fibres with a core diameter of at least 4 $\mu$m, this renders features 160 with a dimension of at least 1.5 $\mu$m, such as at least 2.0 $\mu$m.

Figure 17:
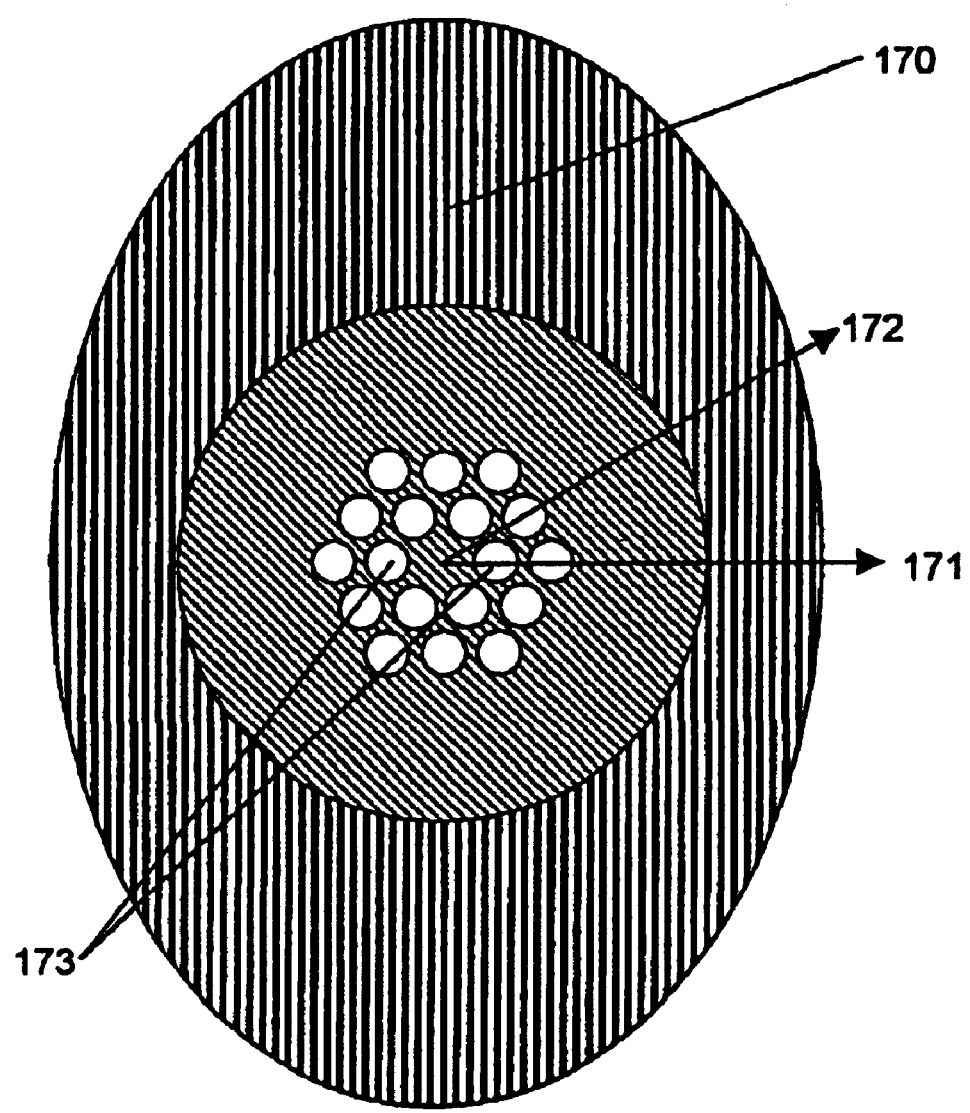
FIG. 17 shows schematically a fibre according to the present invention where a non-circular outer cladding is used. The orientation of the outer cladding is determined from the micro-structure in or around the core region. The outer cladding shape determines mechanically which bending direction(s) will be dominant for the fibre, and avoids bending directions that are most harmful for the fibre.

The present inventors have realised yet another manner of improving micro-structured fibres through the use of outer lying regions that mechanically can favour specific bending directions. FIGS. 17 to 21 shows schematic illustrations micro-structured fibre with non-circular and non-equilateral polygonal shapes of the outer part of the fibres. This provides new means for controlling bending induced properties such as macro-bending losses, dispersion and cut-off, etc. In FIG. 17 is seen an outer cladding region 170 for obtaining a preferred bending direction 171 (or the direction 180-degrees opposite 171). The present inventors have realised that any given micro-structured fibre may be improved with respect to lower macro-bending losses by having the fibre bend in preferred directions. The figure shows a fibre with an outer cladding region 170—which may be composed of silica, polymer, or various other materials, e.g. materials with micro-structures—that has an axis of symmetry defined by the shortest dimension (parallel to and coinciding with 171) of the outer cladding region 170. The mode field will experience less leakage under bending in direction 171 than if the fibre had been bend in direction 172 as the field will more easily escape in directions between two low-index features. Hence, the specific orientation of the outer cladding region 170 preferably depends on the specific micro-structured. In a preferred embodiment, the outer region 170 is oriented such that it has a smallest dimension with a smallest axis that substantially coincides with an axis through centres of two opposite, innermost cladding features 173. In other words, centres of two innermost, opposite cladding features 173 are substantially positioned on the smallest axis.

Figure 18:
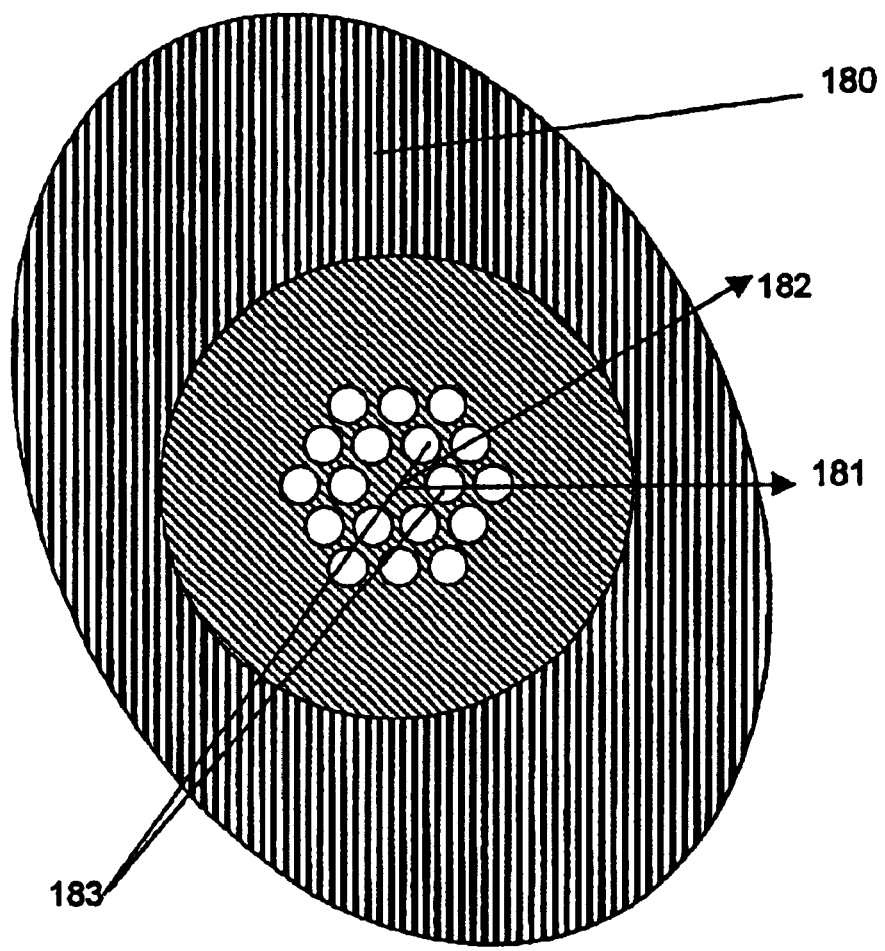
FIG. 18 shows schematically a fibre according to the present invention where an outer cladding with a non-circular and non-equilateral polygonal outer shape is used. During bending, this shape will mechanically favour bending of the fibre in certain direction compared to others and thereby provide new means for controlling macro-bending losses properties as well as stripping off of higher order modes, and, thereby, expand the single-mode operation range of the fibre.
Figure 19:
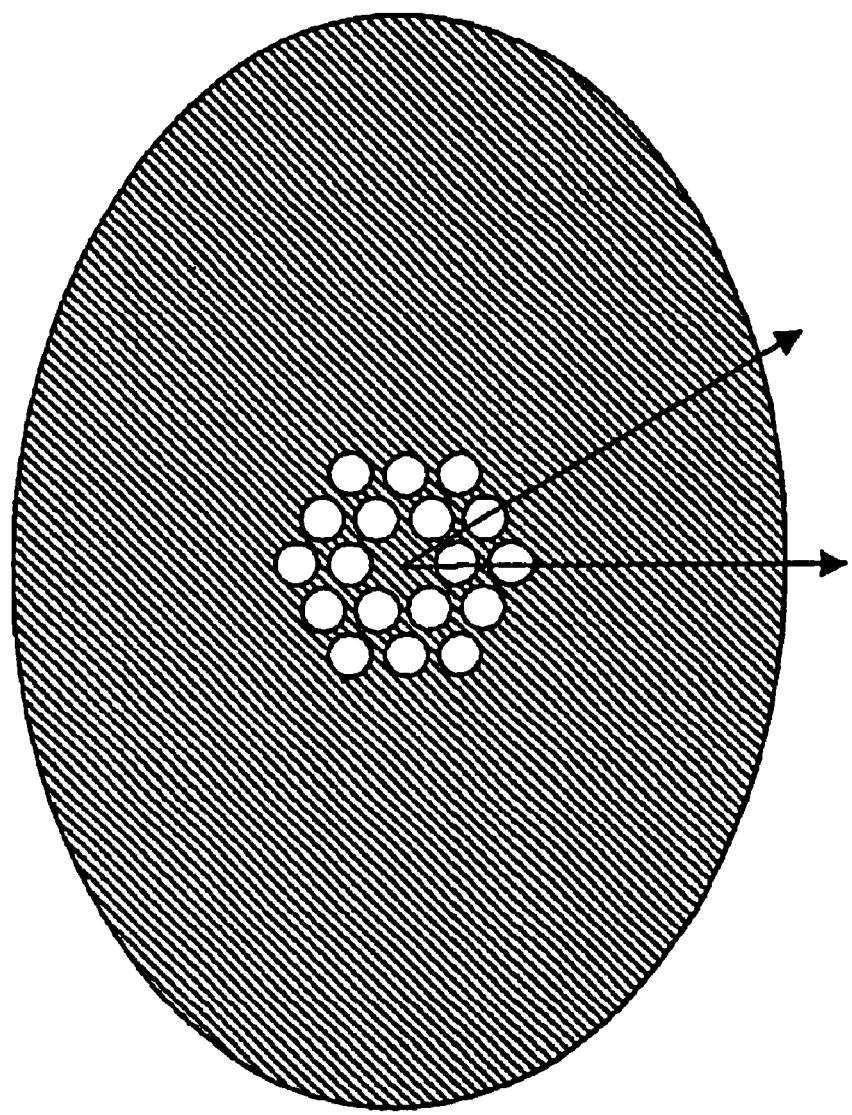
FIG. 19 shows schematically another fibre according to the present invention where an elliptical outer shape is used and the overcladding is made from the same material as the background material of the micro-structure.
Figure 20:
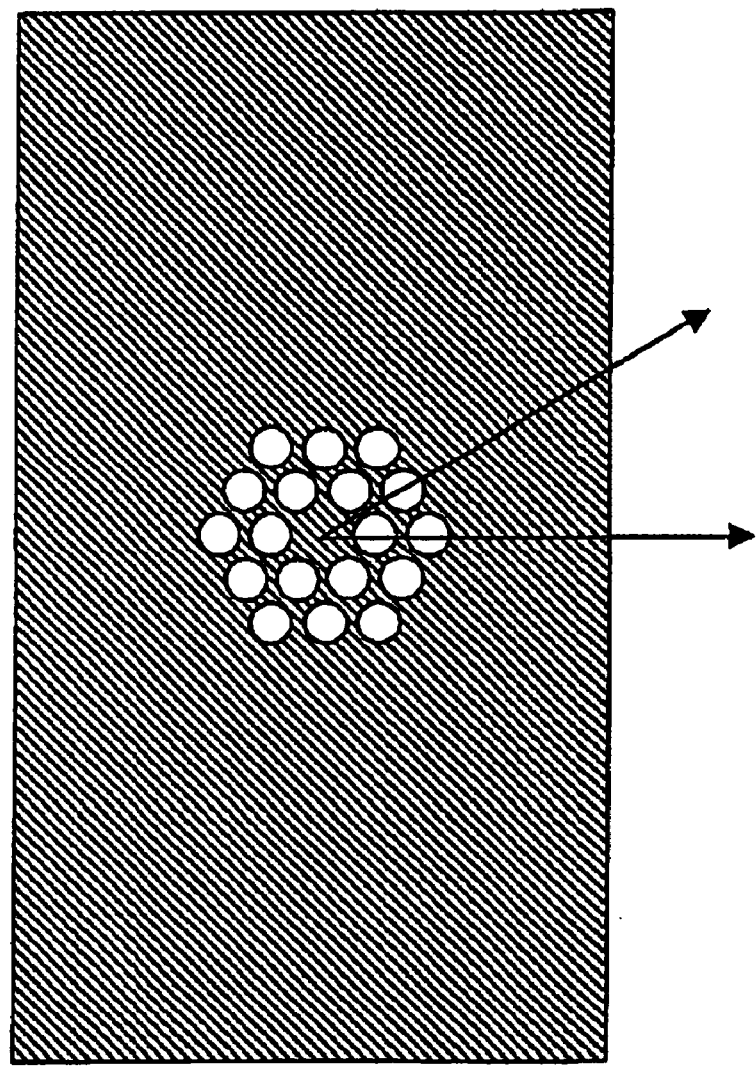
FIG. 20 shows schematically another fibre according to the present invention where a rectangular outer shape is used.

The present inventors have further realised that if the cladding features are large enough to provide bending insensitivity of the fundamental mode at any bending direction for realistic bending radil, it will be advantageous to bend the fibre in the direction 182 in order for higher order modes to be stripped off through macro-bending losses—see FIG. 18. In this manner it will be possible to expand the single-mode range of a given micro-structured fibre. In this latter preferred embodiment, the smallest dimension of the outer cladding region 180 should be oriented along the direction 182. This preferred embodiment may also be described by stating that the smallest dimension of the outer cladding region 180 should have an orientation that coincides with an axis through two bridging areas positioned opposite each other around the core centre. In other words, centres of two innermost, adjacent cladding features 183 are substantially equidistant to an axis (coinciding with 182) defined by the smallest dimension of the outer cladding region 180.

Other shapes than elliptical, such as rectangular, may also provide the same type of functionality as described above, and therefore be advantageous. An example of a rectangular shape of the outer cladding is shown schematically in FIG. 20. Another preferred shape is shown schematically in FIG. 21.

In yet another aspect relating to macro-bending properties of micro-structured fibres, the present inventors have realized that it is possible to control the direction of radiation of a guided mode during fibre bending. This may e.g. be performed using the types of non-circular and non-equilateral-polygonal shaped cladding regions as described previously, or it may be performed by specially designed arrangement of micro-structured features in the cladding (and/or core) region. Considering first the types of non-circular outer cladding features that was described above, the radiation will predominantly take place in two, opposite directions, namely from the core centre and along the axis defined from the smallest dimension of the outer cladding. If, however, the cladding features in, e.g., one half of the micro-structured part of the cladding region are positioned so as to provide a more dense structure, then the radiation in one of the afore-mentioned directions will be stronger than in the other. Therefore, in another aspect, the present invention relates to micro-structured fibres with different micro-structures in different directions from the core centre. An example of a preferred embodiment of a fibre with such bending properties is illustrated schematically in FIG. 22. The fibre has micro-structures with different characteristics in different directions from the core centre. The fibre has cladding features 220 that are smaller in size in approximately half the micro-structured part of the fibre. Also smaller segments of the micro-structured part of the fibre may contain features with different characteristics, and still provide the functionality of directional dependent radiation. The different micro-structured parts of the fibre may be obtained in various ways, by different feature sizes (as in FIG. 22), different feature arrangements, different periodicity, etc. Fibres according to this invention may find possible applications as pumping components, where the fibre is coiled around a medium that should absorb light radiated from the coiled fibre. Various types of applications, where a micro-structured fibre is used to provide optical energy to a single or more media are also covered by the present invention. Typically, the fibre will provide low loss guidance of electromagnetic energy (light) from a source to a specific medium. By coiling the fibre according to the present invention around the medium with a specific mechanical bending determined by an outer non-circular cladding region, the energy of the guided mode can be radiated to the media by the use of micro-structures with different periodicity in different directions from the core. Hence, the fibre should be designed to radiate its energy in direction of the inside of the fibre coil. This property is not possible using conventional fibres. The present inventors have further realised that such a property can be obtained also in micro-structured fibres guiding light by photonic bandgap effects (where a full periodicity of a micro-structured cladding region can be tolerated). The present invention, therefore, also covers the afore-mentioned fibre pumping applications, where a photonic bandgap guiding micro-structured fibre is used.

Figure 22:
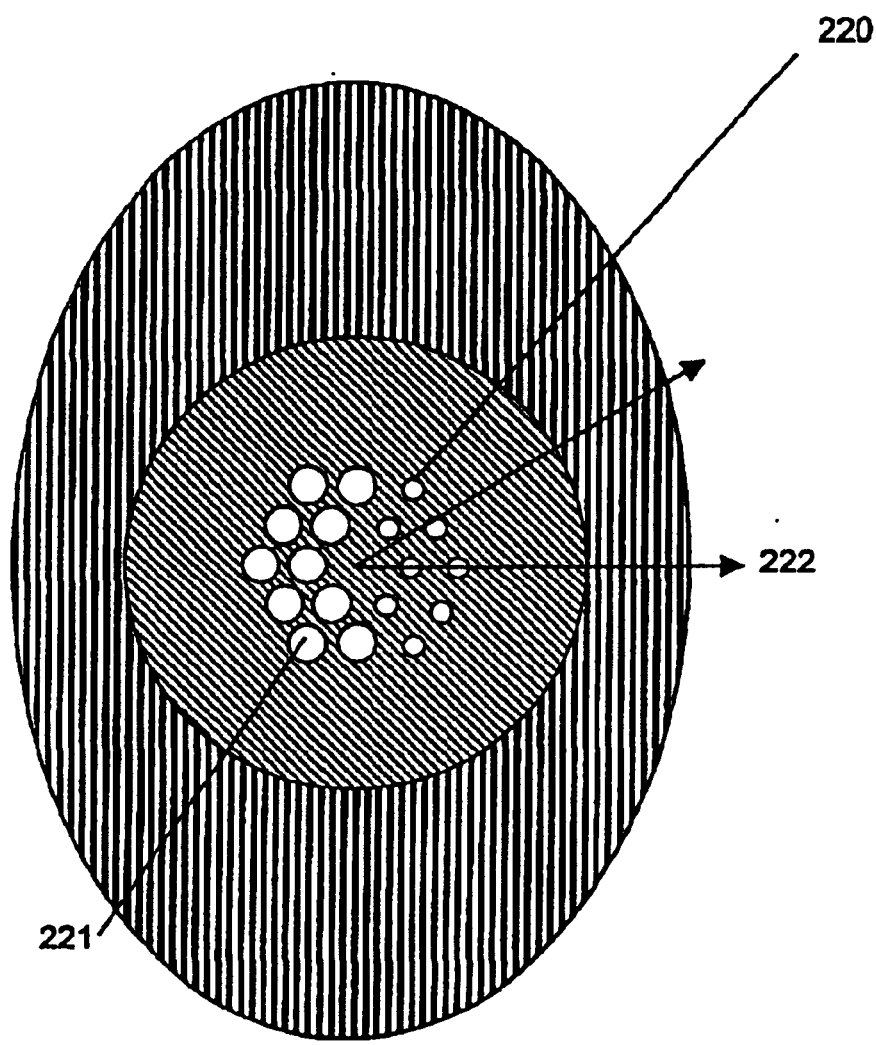
FIG. 22 shows schematically a fibre according to the present invention where a non-circular and non-equilateral polygonal outer cladding is used. The orientation of the outer cladding is determined with respect to the orientation of the micro-structure in or around the core region. The outer cladding shape and the micro-structure in the fibre determines a preferred direction of radiation during fibre bend. This fibre may, alternatively, be used to provide strongly dispersive fibres—where the dispersion can be tuned through adjusting the fibre bend radius.

The present inventors have further realised that fibres with a design as schematically outlined in FIG. 22 may be used to obtain fibre dispersion that Is strongly dependent on the fibre bend radius. The fibre may have very large holes 221—significantly above the critical size for prior art fibres—and be single mode, if the smaller holes 220 are equal to or less the critical size (f<18%). This reason for the fibre being single mode is that higher order modes will leak out the side of the fibre mainly in direction 222—even under straight-fibre operation—whereas the fundamental mode will not leak. For applications where fibre dispersion are of importance—such as e.g. for dispersion compensation or dispersion slope compensation—the present inventors have realised that the type of fibre shown in FIG. 22 may be advantageous. Most importantly, the present inventors have realised that the dispersion in fibres here disclosed can be controlled to a larger degree than standard fibres through the fibre bending radius. For a straight fibre, the propagating mode will experience specific surroundings (core and cladding structures)—and, therefore, a specific dispersion. If the fibre is bend at a certain radius, the mode field will be differently distributed in the core/cladding region, and the fibre will experience a different dispersion. Hence, a tuneable dispersion becomes feasible, or a certain, fixed dispersion can be reached by bending the fibre to a certain radius. In order to avoid the mode field from leaking away during the fibre bend, it is advantageous that the fibre is bend in the direction 222 of the smaller features 220, since the mode field will then experience the larger features 221 more strongly (increasing the waveguide dispersion) as well as these larger features 221 will ensure that the mode field is not radiated away. Hence, the fibre can be made robust and single mode for large mode areas and have special dispersion properties unattainable in conventional as well as prior art micro-structured fibres. In order to ensure that the fibre is bend in the direction 222 it will again be an advantage to utilize a non-circular outer cladding region as previously discussed.

Figure 23:
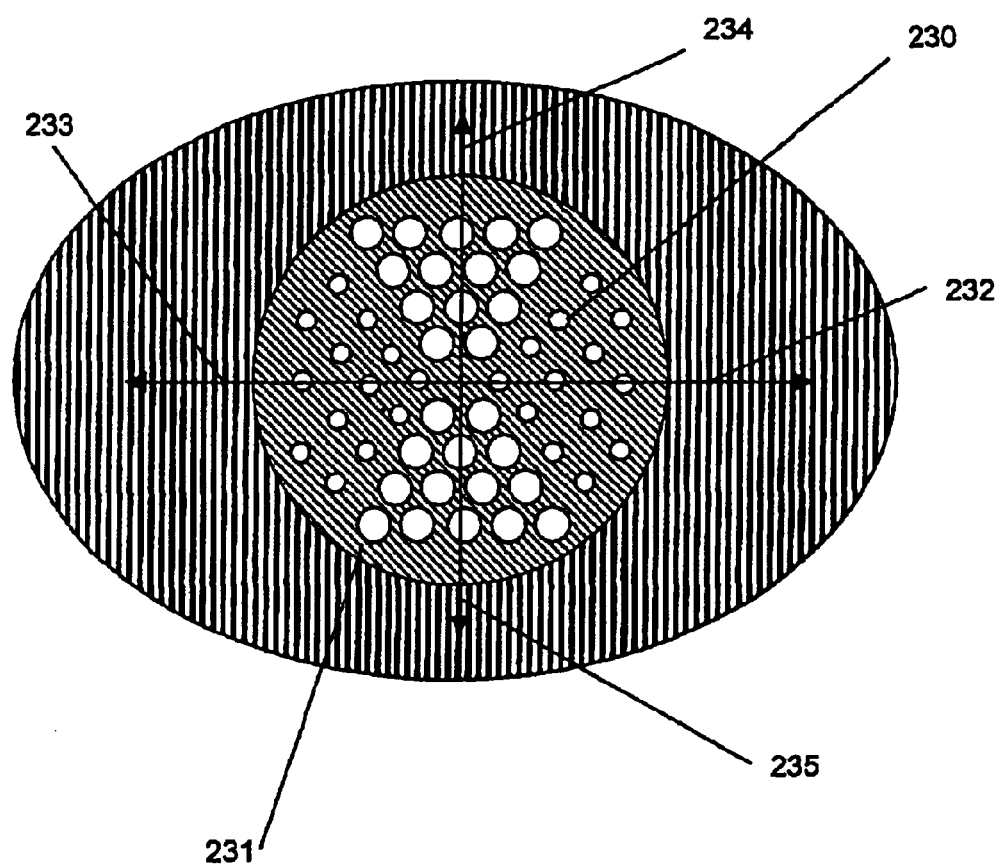
FIG. 23 shows another example of a micro-structured fibre with a non-circular outer and non-equilateral polygonal cladding. The fibre will be single mode and robust for larger mode areas than prior art fibres.

As a further preferred embodiment of a fibre with a substantially elliptical outer cladding region, it is preferred to have a fibre with smaller features 230 positioned as in FIG. 23 in direction to towards the largest dimension of the outer cladding region and larger features 231 positioned in directions towards the smallest dimension of the outer cladding region. In this manner, a straight fibre will only guide a single mode, even for very large features 231 (f>18%), when the smaller features are relatively small (f<18%). The reason for this is that a higher order mode will radiate away in the directions 232 and 233. The fibre in FIG. 23 will furthermore be relatively insensitive to macro-bending losses, since the outer cladding region ensures that the fibre will predominantly be bend in the directions 234 and 235. For bending in these directions, the larger holes 231 will provide a strong confinement of the guided mode. The fibre in FIG. 23 can, therefore, be realised with a relatively large mode area, it can be single mode and it can be insensitive to macro-bending losses—all at the same time.

Figure 21:
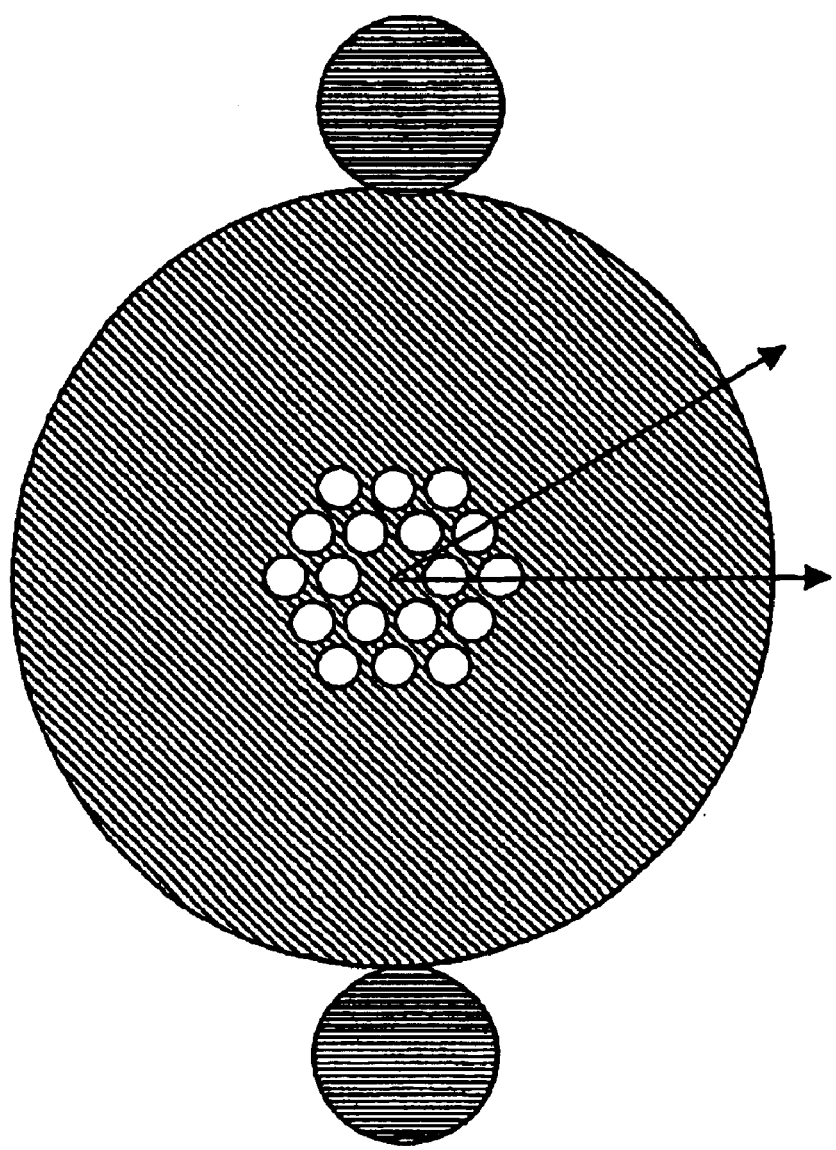
FIG. 21 shows schematically another fibre according to the present invention where two (smaller) circular, elongated elements have been fused on the outside of the fibre to favour mechanically bending in predetermined directions.

In order to make an outer cladding that ensures bending in one or two preferred directions various methods and techniques can be used. The outer cladding region may be made already at the preform level—for example by fusing two (smaller) glass rods to the preform as indicated in FIG. 21. Alternatively, the outer cladding region may be applied to the fibre after drawing—such as e.g. through various types of coating, jacketing, cabling etc.

For all aspects of the present invention, it may be advantageous to have a fraction or all of the core area doped to provide a special refractive index profile for tailoring dispersion properties of the fibres, or for example to provide a higher refractive index than the refractive index of the background material, which may be advantageous for splicing of micro-structured fibre to conventional fibres or to other micro-structured fibres, etc. During splicing the features may collapse—leaving a solid background material that is incapable of providing guidance. Hence, to have a part of the core region doped with e.g. Germanium may provide improvements with respects to splicing losses. In a preferred embodiment, a part of the core is doped to provide a higher refractive index in a central part of the core, with a diameter of less than 2 μm, such as less than 1 μm.

Finally, it should be emphasised that both periodic and non-periodic arrangements of features can be used in all aspects of the present invention—as well as combinations of these types of arrangements in various regions of a single fibre.

What is claimed is:

1. A micro-structured optical fibre for guiding light at an operating wavelength, said optical fibre having an axial direction and a cross section perpendicular to said axial direction, said optical fibre comprising:

a core region, an inner cladding region surrounding said core region, said cladding region comprising a multiplicity of spaced apart inner cladding features that are elongated in the fibre axial direction and disposed in an inner cladding material, said inner cladding features having a smallest cross-sectional dimension, $d_{i,min}$, and a largest cross-sectional dimension, $d_{i,max}$, and having a centre-to-centre spacing, $\Lambda_i$, between two neighbouring inner cladding features, an outer cladding region surrounding said inner cladding region, said outer cladding region comprising a multiplicity of spaced apart outer cladding features that are elongated in the fibre axial direction and disposed in an outer cladding material, at least part of said outer cladding features having a smallest cross-sectional dimension, $d_{o,min}$, and having a centre-to-centre spacing, $\Lambda_o$, between two neighbouring inner cladding features, wherein $d_{i,min}$ is in the range from $0.35\Lambda_i$ to $0.50\Lambda_i$, $d_{o,min}$ is in the range from $0.50\Lambda_o$ to $0.90\Lambda_o$, $d_{i,min}$ is smaller than $d_{o,min}$, and $\Lambda_i$ is larger than 2.0 μm.

2. An optical fibre according to claim 1 wherein $d_{i,min}$ is in the range from $0.40\Lambda_i$ to $0.45\Lambda_i$.

3. An optical fibre according to claim 1 wherein $d_{o,min}$ is in the range from $0.50\Lambda_o$ to $0.60\Lambda_o$.

4. An optical fibre according to claim 1 wherein $d_{i,max}$ is in the range from $1.0 d_{i,min}$ to $2.0 d_{i,min}$.

5. An optical fibre according to claim 1 wherein $\Lambda_i$ is in the range from $0.3\Lambda_o$ to $3.0\Lambda_o$, or $\Lambda_i$ is about equal to $\Lambda_o$.

6. An optical fibre according to claim 1 wherein $\Lambda_i$ is larger than 2.5 μm, such as larger than 3 μm, such as larger than 5 μm, such as larger than 10 μm, or such as larger than 25 μm.

7. An optical fibre according to claim 1 wherein $d_{o,min}$ is between 10–50% larger than $d_{i,min}$.

8. An optical fibre according to claim 7 wherein $d_{o,min}$ is between 10–20% larger than $d_{i,min}$.

9. An optical fibre according to claim 8 wherein $d_{o,min}$ is between 10–15% larger than $d_{i,min}$.

10. An optical fibre according to claim 1 wherein the core region has a geometrical index $N_{coge}$, the inner cladding region has a geometrical index $N_{ige}$, the outer cladding region has a geometrical index $N_{oge}$, and $N_{coge} > N_{ige} >$ or $= N_{oge}$ for light guided at said operating wavelength.

11. An optical fibre according to claim 1 wherein the core region has an effective refractive index $N_{coef}$, the inner cladding region has an effective refractive index $N_{ief}$, the outer cladding region has an effective refractive index $N_{oef}$, and $N_{coef} > N_{ief} >$ or $= N_{oef}$ for light guided at said operating wavelength.

12. An optical fibre according to claim 1 wherein the outer cladding features being nearest neighbours to the inner cladding region all have a smallest cross-sectional dimension given by $d_{o,min}$.

13. An optical fibre according to claim 1 wherein a majority or all of the outer cladding features have a smallest cross-sectional dimension given by $d_{o,min}$.

14. An optical fibre according to claim 1 wherein at least part of the inner cladding features in the cross-section have an elongated shape, with the largest cross-sectional dimension $d_{i,max}$ being oriented in a direction substantially towards the centre of the core region.

15. An optical fibre according to claim 1 wherein the cladding features are periodical features.

16. An optical fibre according to claim 1 wherein all or at least a part of the cladding features are non-periodical features.

17. An optical fibre according to claim 1 wherein the core region is a substantially solid core made of a core material.

18. An optical fibre according to claim 17 wherein the effective refractive index of the core $N_{cief}$ and/or the geometrical index of the core $N_{coge}$ is substantially equal to the refractive index of the core material.

19. An optical fibre according to claim 1 wherein the optical fibre is dimensioned to guide light at an operating wavelength selected from wavelengths in the range of 300 nm to 1600 nm in a single mode.

20. An optical fibre according to claim 19 wherein the core region comprises one core feature or a multitude of spaced apart core features.

21. An optical fibre according to claim 20 wherein the core features have a cross-sectional dimension being smaller than the smallest cross-sectional dimension of the inner cladding features.

22. An optical fibre according to claim 20 wherein the core features are voids.

23. An optical fibre according to any of claim 22 wherein the voids of the core region contain air, another gas, or a vacuum.

24. An optical fibre according to claim 22 wherein at least part of or all of the core features and/or the cladding features are voids containing polymer(s), a material providing an increased third-order non-linearity, photo-sensitive material, or a rare earth material.

25. An optical fibre according to claim 20 wherein the core region contains core features with a non-circular symmetric shape in the fibre cross-section.

26. An article comprising an optical fibre according to claim 19 wherein the core region comprises a core feature with a higher refractive index than any material surrounding the core feature.

27. An article comprising an optical fibre according to claim 26 wherein the core feature has a dimension of less than 2 μm, such as less than 1 μm.

28. An optical fibre according to claim 1 wherein the optical fibre is dimensioned to guide light at an operating wavelength about 1550 nm in a single mode.

29. An optical fibre according to claim 1 wherein the refractive index of the core material is lower than the refractive index of the inner and/or outer cladding material.

30. An optical fibre according to claim 1 wherein the refractive index of the core material is substantially equal to the refractive index of the inner and/or outer cladding material.

31. An optical fibre according to claim 30 wherein the core material and the inner cladding material are made of the same material.

32. An optical fibre according to claim 30 wherein the core material an the outer cladding material are made of the same material.

33. An optical fibre according to claim 1 wherein the core material is silica or polymer.

34. An optical fibre according to claim 1 wherein the inner and/or outer cladding material is silica or polymer.

35. An optical fibre according to claim 1 wherein the cladding features are voids.

36. An optical fibre according to claim 35 wherein the voids of the cladding regions contain air, another gas, or a vacuum.

37. An optical fibre according to claim 1 wherein the core and/or any of the cladding materials contains polymer(s), are material(s) providing an increased third-order non-linearity, are photo-sensitive material(s), or are rare earth material(s).

38. An optical fibre according to claim 1 wherein said fibre is dimensioned to guide light of an operating wavelength in two substantially, non-degenerate polarization states.

39. An optical fibre according to claim 38 wherein the fibre is characterized by a birefringence of at least $10^{-6}$, such as of at least $10^{-4}$, such of as at least $10^{-3}$.

40. An optical fibre according to claim 1 wherein the shape of the core region deviates substantially from a circular shape in the fibre cross-section.

41. An optical fibre according to claim 1 wherein the shape of the core region deviates substantially from a quadratic shape, a hexagonal shape, or a higher order polynocnial shape in the fibre cross-section.

42. An optical fibre according to claim 1 wherein the shape of the core region is substantially rectangular in the cross-section.

43. An optical fibre according to claim 1 wherein the core region and/or the cladding regions have substantially a 180 degree rotational symmetry in the fibre cross-section.

44. An article comprising an optical fibre according to claim 1 wherein the fibre is coiled with a bend radius of 20 cm or less, such as 15 cm or less, such as 10 cm or less, such as 6 cm or less, such as 1 cm or less.

45. An article according to claim 44 wherein the fibre is used for dispersion compensation or dispersion slope compensation.

* * * * *